United States Patent
Yamanaka et al.

(10) Patent No.: US 8,254,209 B2
(45) Date of Patent: Aug. 28, 2012

(54) ACOUSTIC WAVE SENSOR

(75) Inventors: Hiroshi Yamanaka, Moriguchi (JP);
Yoshifumi Watabe, Tondabayashi (JP);
Yoshiaki Honda, Souraku-gun (JP);
Kousaku Kitada, Neyagawa (JP);
Hiroshi Kawada, Neyagawa (JP);
Tomoo Ohtsuka, Takarazuka (JP);
Kazuo Sawada, Katano (JP); Hiromichi Goto, Hirakata (JP)

(73) Assignee: Panasonic Corporation, Osaka (JP)

( * ) Notice: Subject to any disclaimer, the term of this patent is extended or adjusted under 35 U.S.C. 154(b) by 668 days.

(21) Appl. No.: 11/572,588

(22) PCT Filed: Jul. 27, 2005

(86) PCT No.: PCT/JP2005/014164
§ 371 (c)(1),
(2), (4) Date: Jan. 24, 2007

(87) PCT Pub. No.: WO2006/011650
PCT Pub. Date: Feb. 2, 2006

(65) Prior Publication Data
US 2008/0291784 A1 Nov. 27, 2008

(30) Foreign Application Priority Data

Jul. 27, 2004 (JP) .................................. 2004-219330
Jul. 27, 2004 (JP) .................................. 2004-219331
Jan. 12, 2005 (JP) .................................. 2005-005639
Jan. 12, 2005 (JP) .................................. 2005-005640
Mar. 24, 2005 (JP) .................................. 2005-086787

(51) Int. Cl.
*G01S 15/06* (2006.01)
(52) U.S. Cl. .......................... 367/99; 367/118; 381/164

(58) Field of Classification Search .................. 381/164; 367/99, 118, 147
See application file for complete search history.

(56) References Cited

U.S. PATENT DOCUMENTS
3,782,177 A 1/1974 Hoop
(Continued)

FOREIGN PATENT DOCUMENTS
EP 0231596 8/1987
(Continued)

OTHER PUBLICATIONS

Wyber, Ronald J., "The Design of a Spark Discharge Acoustic Impulse Generator", IEEE Transactions on Acoustics, Speech and Signal Processing, vol. ASSP-23, No. 2, Apr. 1975.*

(Continued)

*Primary Examiner* — Ian Lobo
(74) *Attorney, Agent, or Firm* — Greenblum & Bernstein, P.L.C.

(57) ABSTRACT

In an acoustic wave sensor for detecting a distance to an object and an orientation where the object is located with using acoustic waves, an acoustic wave generating device generating an acoustic wave by applying thermal impact to the air with no mechanical vibration is used as a wave transmitting device, and an electric capacitance microphone converting variation of pressure due to acoustic wave to variation of an electric signal is used as each wave receiving device. Therefore, dead zone caused by reverberation component included in the acoustic wave transmitted from the wave transmitting device and dead zone caused by reverberation component included in wave receiving signals outputted from the wave receiving devices can be shortened and angular sensitivity of the acoustic wave sensor can be increased, in comparison with a conventional acoustic wave sensor using piezoelectric devices as the wave transmitting device and the wave receiving devices.

6 Claims, 17 Drawing Sheets

U.S. PATENT DOCUMENTS

| | | | |
|---|---|---|---|
| 5,903,518 A * | 5/1999 | Benwell et al. | 367/147 |
| 6,304,179 B1 | 10/2001 | Lotito et al. | |
| 2002/0048220 A1 | 4/2002 | Khuri-Yakub et al. | |
| 2002/0076070 A1 | 6/2002 | Yoshikawa et al. | |
| 2005/0201575 A1 * | 9/2005 | Koshida et al. | 381/164 |

FOREIGN PATENT DOCUMENTS

| | | |
|---|---|---|
| EP | 1215936 | 6/2002 |
| GB | 1421849 | 1/1976 |
| JP | 61-220600 | 9/1986 |
| JP | 62-149299 | 7/1987 |
| JP | 3-140100 | 6/1991 |
| JP | 11-300274 A * | 11/1999 |
| JP | 2002-156451 | 5/2002 |
| JP | 2003-279640 | 10/2003 |
| JP | 2004-180262 | 6/2004 |
| WO | 01/44765 | 6/2001 |

OTHER PUBLICATIONS

Patent Abstracts of Japan, vol. 2002, No. 09, Sep. 4, 200, for JP 2002-156451.

Patent Abstracts of Japan, vol. 015, No. 359 (E-1110), Sep. 11, 1991, For JP 03-140100.

Patent Abstracts of Japan, vol. 2003, No. 12, Dec. 5, 2003 for JP 2003-279640.

Haller et al., "A Surface Micromachined Electrostatic Ultrasonic Air Transducer," IEEE Transactions on Ultrasonics, Ferroelectrics and Frequency Control, IEEE Service Center, Piscataway, NJ, US, vol. 43, No. 1, Jan. 1996, pp. 1-6, XP011062672.

Jin et al., "The Microfabrication of Capacitive Ultrasonic Transducers," Journal of Microelectromechanical Systems, IEEE Service Center, Piscataway, NJ, US, vol. 7, No. 3, Sep. 1998, XP011034808.

Mattila et al., "Bandwidth Control of an Electrostatic Ultrasonic Transducer," Sensors and Actuators A, Elsevier Sequoia S.A., Lausanne, CH, vol. A45, No. 3, Dec. 1, 1994, pp. 203-208, XP000482630.

Kleinschmidt et al., "Ultrasonic robotic-sensors for exact short range distance measurement and object identification," IEEE 1985 Ultrasonics Symposium, Proceedings (CAT. No. 85CH2209-5), vol. 1, 1985, pp. 457-462, XP007904612, San Francisco, CA, US.

* cited by examiner

FIG. 12
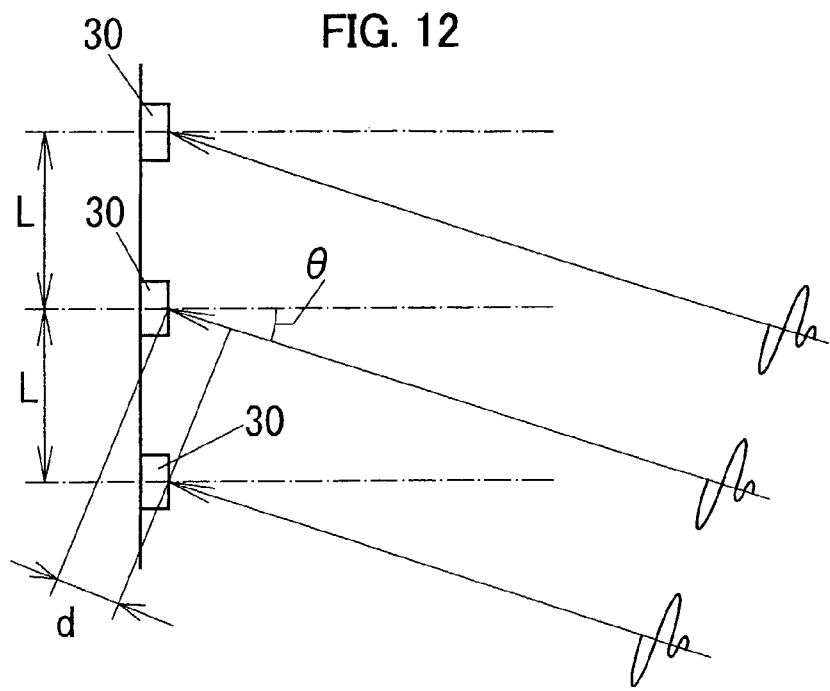
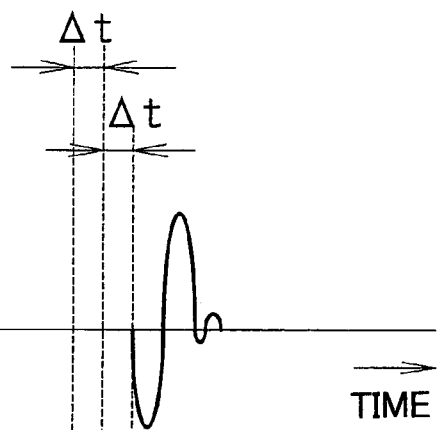
FIG. 13A
FIG. 13B
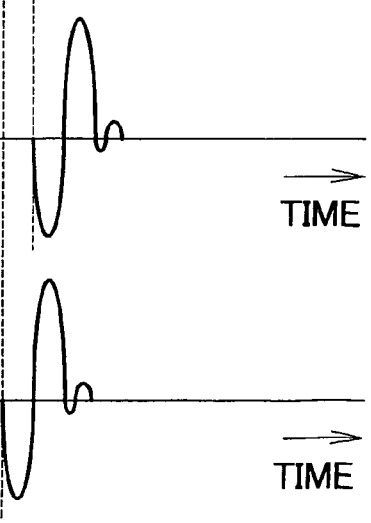
FIG. 13C

ACOUSTIC WAVE SENSOR

TECHNICAL FIELD

The present invention relates to an acoustic wave sensor utilizing acoustic wave for detecting a distance to an object and/or an orientation where the object is located.

BACKGROUND ART

As for such a kind of acoustic wave sensor, for example, Japanese Laid-Open Patent Publication No. 2002-156451 discloses an acoustic wave sensor of reflected wave formula. In the acoustic wave sensor of reflected wave formula, compressional wave such as ultrasonic wave is intermittently transmitted from a wave transmitter having a wave transmitting device to a medium, and reflected wave reflected by an object is received by a wave receiver having a wave receiving device. A distance to the object and an orientation where the object is located is detected on the basis of a time difference from the transmission of the compressional wave to the receiving of the reflected wave.

On the other hand, for example, Japanese Laid-Open Patent Publication No. 2003-279640 discloses an acoustic wave sensor of direct wave formula. In the acoustic wave sensor of direct wave formula, compressional wave is intermittently transmitted from a wave transmitter to a medium, and a distance to the wave transmitter and an orientation where the wave transmitter is located are detected on the basis of a time difference from the transmission of the compressional wave to the receiving of the compressional wave by a wave receiver.

As for the application of the acoustic wave sensor, an ultrasonic level gauge, a back sonar in-vehicle, and so on are provided as examples which propagate the ultrasonic wave in the air. Alternatively, a sonar, a fish detector, and so on are provided as examples which propagate the ultrasonic wave in the underwater. Furthermore, an ultrasonic flaw detector, an ultrasonic CT, and so on are provided as examples which propagate the ultrasonic wave in a structure.

In the above-mentioned acoustic wave sensor, the wave receiver has a plurality of wave receiving devices which are arranged on the same plane for receiving the acoustic waves transmitted from the wave transmitter. When an orientation of arrangement of the wave receiving devices forms a predetermined angle (except cases of right angle and parallel) with respect to an arrival orientation of the acoustic waves corresponding to the orientation where the object is located, time differences occur in times when the wave receiving devices respectively receive the acoustic waves owing to an arrangement pitch of the wave receiving devices and the predetermined angle. Therefore, it is possible to detect the arriving direction of the acoustic wave, that is, the direction where the object is located by detecting phase differences between two signals outputted from adjoining two wave receiving devices when they receive the acoustic waves.

In the conventional acoustic wave sensors, piezoelectric devices are widely used as the wave transmitting device for transmitting acoustic wave in the air and the wave receiving devices for converting received acoustic waves to wave receiving signals of electric signals. In the acoustic wave sensor which uses piezoelectric devices for both of the wave transmitting device and the wave receiving devices, frequency of acoustic wave transmitted from the wave transmitting device is generally set in a frequency near to resonance frequency of the wave transmitting device and the wave receiving devices for a purpose of increasing acoustic pressure of the acoustic wave to be transmitted and sensitivity for sensing acoustic wave in each wave receiving device.

However, in the acoustic wave sensor using the piezoelectric device as the wave transmitting device, reverberation component due to resonance of the wave transmitting device is included in the acoustic wave transmitted from the wave transmitting device. In addition, reverberation component due to resonance of the wave receiving device is included in the wave receiving signal outputted from each wave receiving device in the acoustic wave sensor using the piezoelectric devices as the wave receiving devices. In the acoustic wave sensor using the piezoelectric devices for both of the wave transmitting device and the wave receiving devices, reverberation components due to resonances of both devices are included.

A Q factor (mechanical quality factor Qm) of resonance characteristic of the piezoelectric device is generally larger than 100. Thus, when the wave transmitting device of the piezoelectric device is intermittently driven, the acoustic wave generated by the wave transmitting device becomes vibration wave as shown in FIG. 20. The larger the value of the Q factor of the resonance characteristic becomes, the longer a term T1 necessary for becoming the amplitude of the vibration waveform to the greatest, and the longer a term (reverberation term) T2 necessary for converging the reverberation oscillation become. Thus, the term from the transmission of the acoustic wave to the receiving of the acoustic wave becomes shorter.

Therefore, for example, in the acoustic wave sensor for detecting a distance to an object, it is impossible to detect the distance to the object with respect to the object positioned within a predetermined distance from the wave receiving devices. Hereupon, when a temperature is designated by a symbol "t" (° C.), acoustic velocity "c" (m/s) of acoustic wave is calculated by the equation c=331.5+0.6t. For example, when the temperature is assumed as 14 degrees Celsius, acoustic velocity c is 340 (m/s). In this case, acoustic wave advances only 34 cm per 1 ms. When assuming the reverberation term T2 of the vibration waveform of the acoustic wave transmitted from the wave transmission device is 2 ms, it is impossible to measure the distance to the object located at a position within 34 cm from the wave receiving devices.

As just described, in the acoustic wave sensor using the piezoelectric device as the wave transmitting device, since a dead zone caused by the reverberation component included in the acoustic wave transmitted from the wave transmitting device is longer, a distance to an object relatively near to the wave receiving devices cannot be detected.

Furthermore, it is assumed that two objects are located in relatively shorter distances to the acoustic wave sensor using the piezoelectric devices as the wave transmitting device and the wave receiving devices. Reflected wave reflected by one object may arrive at the wave receiving devices of the acoustic wave sensor while reflected wave reflected by the other object is received by the wave receiving devices. In such a case, it is difficult to distinguish between the reflected waves from these two objects on the basis of the wave receiving signals outputted from the wave receiving devices.

In other words, the acoustic wave sensor using piezoelectric devices for the wave transmitting device and the wave receiving devices has a long dead zone caused by the reverberation component included in the acoustic wave transmitted from the wave transmitting device and the reverberation component included in the wave receiving signals outputted from the wave receiving devices. Thus, even in an area where the distance and/or orientation of the object can be detected by the acoustic wave sensor, when differences among distances from the acoustic wave sensor to a plurality of the objects are smaller, the distances to the objects may not be detected. Accordingly, it is desired to improve angular resolution of the acoustic wave sensor. In addition, the wave transmitting device and the wave receiving devices used in the acoustic wave sensor have characteristics that the Q factor of resonance characteristic becomes larger as the angular resolution becomes lower.

Furthermore, it is possible to constitute a position detecting system for detecting position information of an object to be detected with using the above acoustic wave sensor. For example, according to the above Japanese Laid-Open Patent Publication No. 2003-279640, a position detecting system, which comprises ultrasonic wave transmitters respectively provided on a plurality of migration objects, at least three ultrasonic wave receivers respectively provided in predetermined areas on a ceiling of a building, and a processor for obtaining position information of the migration objects on the basis of a term from a time when the ultrasonic wave transmitter transmits the ultrasonic wave to a time when the ultrasonic wave receiver receives the ultrasonic wave, is proposed.

In such a position detecting system, the ultrasonic wave receivers are provided one by one in every predetermined areas on the ceiling of the building, so that it is necessary to install the ultrasonic wave receivers in at least three places so as to obtain the positioning information of the object to be detected (migration object) in the processor. Furthermore, the position information of the object can be obtained in a domain where sensing areas of three ultrasonic wave receivers are piled up, so that the disposition of the ultrasonic wave receivers is difficult.

DISCLOSURE OF INVENTION

A purpose of the present invention is to provide an acoustic wave sensor in which at least one of dead zone caused by reverberation component included in an acoustic wave transmitted from a wave transmitting device and dead zone caused by reverberation components included in wave receiving signals outputted from wave receiving devices can be shortened, and angular resolution of the acoustic wave sensor can be increased, in comparison with the conventional acoustic wave sensor using the piezoelectric devices as the wave transmitting device and the wave receiving devices.

An acoustic wave sensor in accordance with an aspect of the present invention comprises a wave transmitter having a wave transmitting device which can transmit acoustic wave and a driving circuit for driving the wave transmitting device, and a wave receiver having wave receiving devices directly receive acoustic wave transmitted from the wave transmitter or receive acoustic wave transmitted from the wave transmitter and reflected by an object, and convert received acoustic wave to wave receiving signals of electric signals, thereby at least one of a distance to the wave transmitter or the object and an orientation where the wave transmitter or the object is located can be detected. The wave transmitting device is constituted by an acoustic wave generator generating the acoustic wave by applying thermal impacts to the air.

In this way, when the acoustic wave generator which generates the acoustic wave by applying the thermal impacts to the air is used as the wave generating device, mechanical vibration rarely occurs in the wave generating device. Therefore, a Q factor of resonance characteristic of the wave transmitting device becomes much smaller than a Q factor of resonance characteristic of the piezoelectric device. Consequently, in comparison with the conventional acoustic wave sensor using the piezoelectric devices as the wave transmitting device and the wave receiving devices, the dead zone caused by reverberation component included in the acoustic wave transmitted from the wave transmitting device can be shortened, and the angular resolution can be increased.

An acoustic wave sensor in accordance with another aspect of the present invention comprises a wave transmitter having a wave transmitting device which can transmit acoustic wave and a driving circuit for driving the wave transmitting device, and a wave receiver having wave receiving devices directly receive acoustic wave transmitted from the wave transmitter or receive acoustic wave transmitted from the wave transmitter and reflected by an object, and convert received acoustic wave to wave receiving signals of electric signals, thereby at least one of a distance to the wave transmitter or the object and an orientation where the wave transmitter or the object is located can be detected. Each of the wave receiving devices is constituted by an electrical capacitance microphone converting variation of pressure due to acoustic pressure of the acoustic wave to variation of electric signal.

In this way, when the electric capacitance microphones are used as the wave receiving devices, a Q factor of resonance characteristic of each wave receiving device is smaller than a Q factor of resonance characteristic of the piezoelectric device. In comparison with the conventional acoustic wave sensor using the piezoelectric devices as the wave transmitting device and the wave receiving devices, the dead zone caused by reverberation component included in the wave receiving signal outputted from each wave receiving device can be shortened, and the angular resolution can be increased.

Furthermore, when the acoustic wave generator which generates the acoustic wave by applying the thermal impacts to the air is used as the wave generating device, and the electric capacitance microphones are used as the wave receiving devices, the Q factors of resonance characteristics of the wave transmitting device and the wave receiving devices are smaller than the Q factor of resonance characteristic of the piezoelectric device. Thus, in comparison with the conventional acoustic wave sensor using the piezoelectric devices as the wave transmitting device and the wave receiving devices, the dead zone caused by reverberation component included in the acoustic wave transmitted from the wave transmitting device and the dead zone caused by reverberation component included in the wave receiving signal outputted from each wave receiving device can be shortened, and the angular resolution can be increased.

BRIEF DESCRIPTION OF DRAWINGS

FIG. 12 is a drawing showing a doctrine by which an orientation where an object is located can be detected by an acoustic wave sensor used in the above position detecting system.

FIGS. 13A to 13C are waveform diagrams respectively showing wave receiving signals outputted from the wave receiving devices of FIG. 12 when a driving voltage is applied to the wave transmitting device.

BEST MODE FOR CARRYING OUT THE INVENTION

First Embodiment

An acoustic wave sensor in accordance with a first embodiment of the present invention is described with reference to figures. The first embodiment relates to the acoustic wave sensor detecting both of a distance to an object and an orientation where the object is located in order to recognize three dimension locus of the object.

Figure 1:
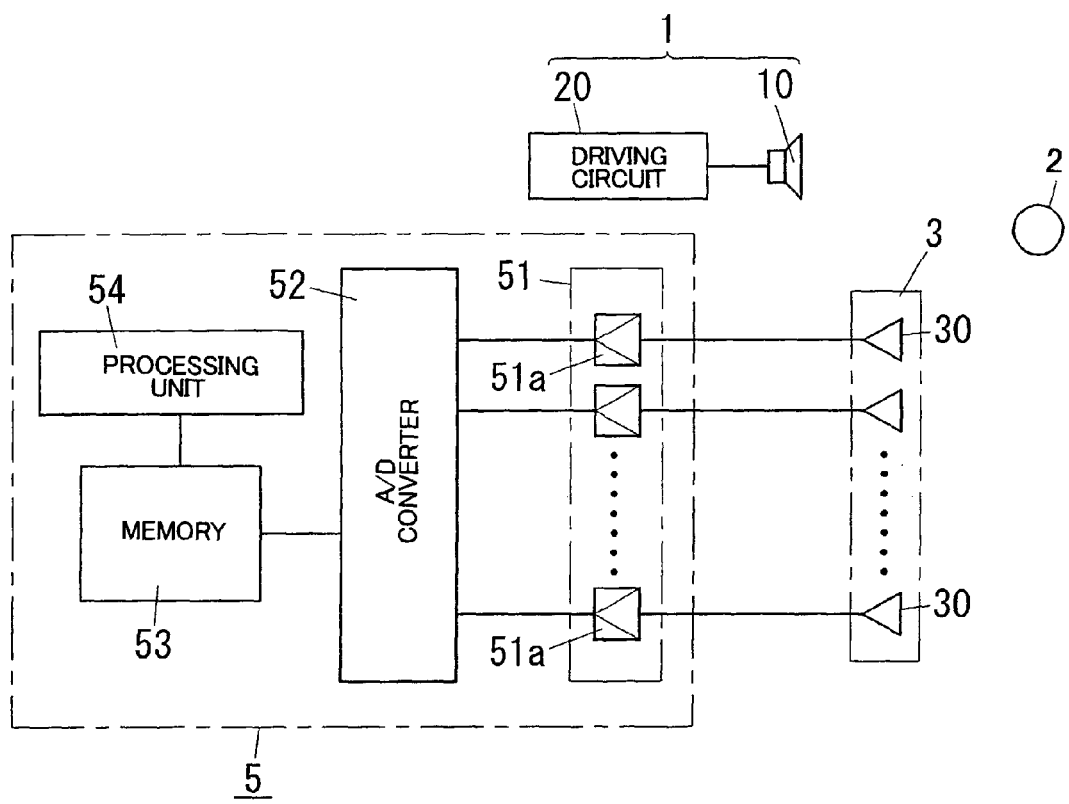
FIG. 1 is a block diagram showing a configuration of an acoustic wave sensor in accordance with a first embodiment of the present invention.

As shown in FIG. 1, the acoustic wave sensor of the first embodiment comprises a wave transmitter 1 for transmitting an acoustic wave (a compressional wave) intermittently in the air, a wave receiver 3 for receiving reflected waves reflected by an object 2, and a signal processing circuit 5 for processing output of the wave receiver 3. The acoustic wave sensor is configured to detect the distance to the object 2 and the orientation where the object 2 is located on the basis of terms from a time when an acoustic wave is transmitted from the wave transmitter 1 to times when the acoustic waves reflected by the object 2 are received by the wave receiver 3.

The wave transmitter 1 comprises a wave transmitting device 10 which can transmit (output) the acoustic wave, and a driving circuit 20 for driving the wave transmitting device 10 for transmitting the acoustic wave intermittently. The driving circuit 20 has a timing controller for controlling timing for intermittently transmitting the acoustic wave from the wave transmitting device 10.

The wave receiver 3 has a plurality of wave receiving devices 30 for receiving the acoustic waves transmitted from the wave transmitting device 10 and reflected by the object 2, and each for converting the received acoustic wave to a wave receiving signal of an electric signal. In the acoustic wave sensor of the first embodiment, a plurality of (for example, ten) wave receiving devices 30 are arranged on the same plane of a single circuit board so as to measure not only the distance to the object 2 but also the orientation where the object 2 is located. Specifically, five wave receiving devices 30 are arranged at a predetermined pitch in a direction parallel to one side of the circuit board, and other five wave receiving devices 30 are arranged at the predetermined pitch in a direction perpendicular to the above side.

Figure 2:
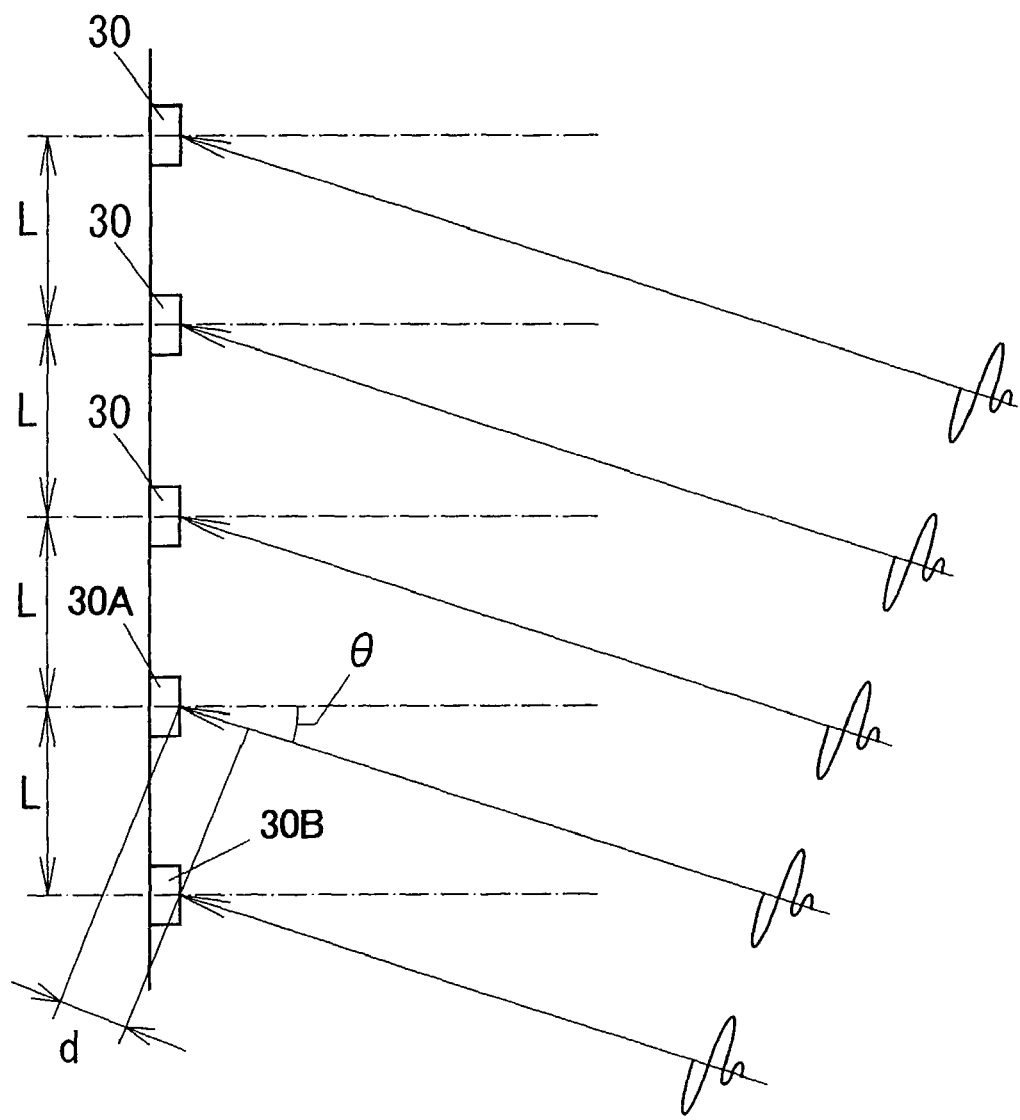
FIG. 2 is a drawing showing a doctrine by which an orientation where an object is located can be detected by the above acoustic wave sensor.

In FIG. 2, only five wave receiving devices 30 arranged in either one the direction are illustrated to simplify the description. It is assumed that the acoustic waves arrive at a plane on which the wave receiving devices 30 are arranged from an orientation crossing at an angle θ degree with respect to perpendicular line of the plane (in other words, the object 2 is located in the orientation having an azimuth angle θ with respect to the wave receiver 3, and an angular degree of wave front of the acoustic wave is θ). Hereupon, acoustic velocity is designated by a symbol "c", a distance (delay distance) between a wave front of an acoustic wave which will arrive at a wave receiving device 30A and a center of adjoining wave receiving device 30B when the acoustic wave arrives at the wave receiving device 30B is designated by a symbol "d", and a distance (above predetermined pitch) between the centers of the adjoining wave receiving devices 30A and 30B is designated by a symbol "L". A time difference Δt necessary for arriving the wave front of the acoustic wave at the wave receiving device 30A is calculated by the equation Δt=d/c=L·sin θ/c. Therefore, the azimuth angle θ in which the object 2 is located can be obtained by processing operation, if the time difference Δt between the times arriving the wave fronts of the acoustic waves at adjoining two wave receiving devices can be measured. In addition, it is desirable to set the above predetermined pitch L to be about a half of the wavelength of the acoustic wave transmitted from the wave transmission device 10.

The signal processing circuit 5 comprises a signal amplifying unit 51 having a plurality of amplifier 51a each for amplifying the wave receiving signal outputted from each wave receiving device 30, an A/D converter 52 for converting an analogue wave receiving signal amplified by each of the amplifier 51a to a digital wave receiving signal and for outputting the digital wave receiving signal, a memory 53 for memorizing the outputs from the A/D converter 52, and a processing unit 54 consisting of a microcomputer for performing a calculation of a distance to the object 2 and a calculation of an orientation where the object 2 is located with using the data of the wave receiving signals memorized in the memory 53. Though the wave receiving signal is always in a state to be outputted from each wave receiving device 30, the processing unit 54 makes the A/D converter 52 operative while a predetermined wave receiving term, only when the processing unit 54 receives a timing signal outputted in synchronism with a control signal for controlling the timing of transmission of the acoustic wave from the timing controller of the driving circuit 20 of the wave transmitter 1. Therefore, acoustic waves which may be reflected by the object 2 can be extracted and detected.

The processing unit 54 has a distance calculating function for calculating a distance to an object 2 and an orientation detecting function for detecting an orientation where the object is located. The distance calculating function calculates the distance to the object 2 on the basis a time difference (in other words, a term from the transmission of the acoustic wave from the wave transmitter 1 to the reception of the acoustic waves reflected by the object 2 by the wave receiver 3) between a time when the processing unit 54 receives the above timing signal (that is, the timing of transmission of the acoustic wave from the wave transmitting device 10) and a time when the digital wave receiving signals are memorized in the memory 53 (that is, the timing that the wave receiving devices 30 receive the acoustic waves, when the delay time in the signal processing circuit 5 is negligible). The orientation detecting function detects the orientation where the object is located (that is, the orientation from which the acoustic wave reflected by the object 2 arrives) with utilizing the wave receiving signals of the wave receiving devices 30 memorized in the memory 53. The processing unit 54 detects the orientation from which the acoustic waves arrive at the wave receiver 3 on the basis of the phase differences of the wave receiving signals outputted from the wave receiving devices 30 and the arrangement of the wave receiving devices 30. The distance calculating function and the orientation detecting function of the processing unit 54 can be realized by executing appropriate programs in the microcomputer.

When the largest measurable distance of the acoustic wave sensor in the first embodiment is assumed, for example, 5 meters, the acoustic wave should go ahead 10 meters at the maximum in the air. While the acoustic wave transmitted from the wave transmitting device 10 arrives at the object 2, reflected by the object 2 and arrives at the wave receiver 3, the acoustic wave is attenuated by propagation loss such as divergence loss (range attenuation), absorption loss, reflection loss, or the like. Thus, the wave receiving signal outputted from each wave receiving device 30 becomes a minute voltage of 100 to 800 μV extent. The amplifying gain (voltage gain) of each amplifier 51a is set to be 40 to 60 dB so that the reduction of S/N can be prevented. In addition, a term necessary for propagating the acoustic wave in a distance of 10 meters in the air is 30 ms extent, so that the above wave receiving term should be set to 30 ms extent.

The wave receiving signal from each wave receiving device 30 in the wave receiving term is memorized in the memory 53. Specifically, a number of data designated by [a number of wave receiving devices 30]×[a number of wave receiving data outputted from each wave receiving device 30] is memorized in the memory 53. For example, it is assumed that the number of the wave receiving devices 30 is ten, the wave receiving term is 30 ms, the sampling period of the A/D converter 52 is 1 μs (sampling frequency is 1 MHz), and each data is 16 bits. The memory 53 needs capacitance of (10)×{(30×10−3)÷(1×10−6)×16}=4,800,000 bits=600 Kbytes. Therefore, it is preferable to use an SRAM of capacity more than 600 Kbytes as the memory 53.

In a case of detecting the orientation where the object 2 is located, the processing unit 54 has a delay function for delaying the wave receiving signal of each wave receiving device 30 memorized in the memory 53 with a delay time which corresponds to the arrangement pattern (position of the wave receiving device in the arrangement), grouping the delayed wave receiving signals, and outputting the group of the delayed wave receiving signals. The processing unit 54 further has an addition function for adding the group of the delayed wave receiving signals, and a judgment function for comparing a peak value of an added output waveform with a predetermined threshold value and judging that an orientation corresponding to the combination of the delay times as the orientation where the object 2 is located (arrival orientation of the acoustic wave) when the peak value larger than the threshold value appears.

Figure 3:
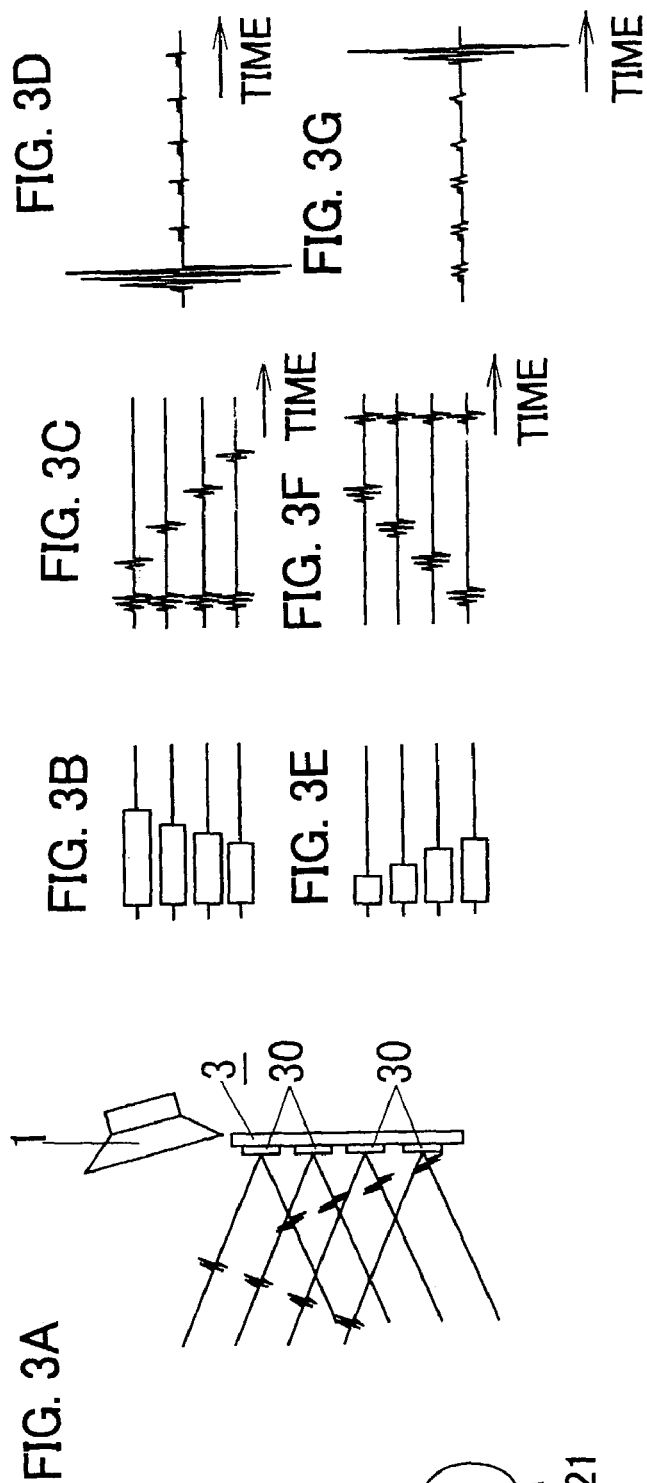
FIG. 3A is a drawing showing a circumstance of arrival of acoustic waves from each object to wave receiving devices when two objects are located in an area where the acoustic wave sensor can detect the object.
FIG. 3B is conceptual drawing showing combination of delay times of the wave receiving devices corresponding to the orientation where the object is located.
FIG. 3C is a waveform diagram showing groups of wave receiving signals outputted from the wave receiving devices delayed in delay times of FIG. 3B.
FIG. 3D is a waveform diagram showing output waveforms which are a result of addition of the groups of the wave receiving signals of FIG. 3C.
FIG. 3E is conceptual drawing showing another combination of delay times of the wave receiving devices corresponding to the orientation where the object is located.
FIG. 3F is a waveform diagram showing groups of wave receiving signals outputted from the wave receiving devices delayed in delay times of FIG. 3E.
FIG. 3G is a waveform diagram showing output waveforms which are a result of addition of the groups of the wave receiving signals of FIG. 3F.

Subsequently, the detection of the orientations where the objects are located when two objects are located in a detectable area (object area) of the acoustic wave sensor, and the acoustic waves arrive at each wave receiving device 30 in two orientations is described. As shown in FIG. 3A, it is assumed that two objects 21 and 22 are located in the detectable area (object area) of the acoustic wave sensor. FIG. 3A, however, shows only four wave receiving devices 30 arranged on a line on the same plane to simplify the description.

FIG. 3B shows an example of a combination of the above delay time of each wave receiving device 30 corresponding to the orientation where the object 22 is located, and overall length of a transversal side of each rectangle corresponds to overall length of each delay time of the wave receiving device 30. FIG. 3C shows a group of the wave receiving signals of the wave receiving devices 30 which are delayed with the delay times of FIG. 3B. Since the acoustic wave reflected by the object 21 and the acoustic wave reflected by the object 22 arrive at each wave receiving devices 30, two wave receiving signals are outputted from each wave receiving device 30. There is substantially no phase difference among the wave receiving signals at left hand outputted from respective wave receiving devices 30 due to the above delay time. These are the wave receiving signals caused by the acoustic waves reflected by the object 22. On the other hand, the phase differences among the wave receiving signals at right hand outputted from respective wave receiving devices 30 are expanded due to the above delay time. These are the wave receiving signals caused by the acoustic waves reflected by the object 21. FIG. 3D shows a waveform which is added the group of the wave receiving signals of FIG. 3C. In this way, by adding the group of the wave receiving signals, the amplitude of the wave receiving signals caused by the acoustic waves reflected by the object 22 and having few phase differences are expanded, so that it is possible to distinguish these wave receiving devices from the wave receiving devices caused by the acoustic waves reflected by the object 21.

Similarly, FIG. 3E shows a combination of the above delay time of each wave receiving device 30 corresponding to the orientation where the object 21 is located, and overall length of a transversal side of each rectangle corresponds to overall length of each delay time of the wave receiving device 30. FIG. 3F shows a group of the wave receiving signals of the wave receiving devices 30 which are delayed with the delay times of FIG. 3E. There is substantially no phase difference among the wave receiving signals at right hand outputted from respective wave receiving devices 30 due to the above delay time. These are the wave receiving signals caused by the acoustic waves reflected by the object 21. On the other hand, the phase differences among the wave receiving signals at left hand outputted from respective wave receiving devices 30 are expanded due to the above delay time. These are the wave receiving signals caused by the acoustic waves reflected by the object 22. FIG. 3G shows a waveform which is added the group of the wave receiving signals of FIG. 3F. In this way, by adding the group of the wave receiving signals, the amplitude of the wave receiving signals caused by the acoustic waves reflected by the object 21 and having few phase differences are expanded, so that it is possible to distinguish these wave receiving devices from the wave receiving devices caused by the acoustic waves reflected by the object 22.

As just described, by setting various sets of different delay times for outputs of the wave receiving devices 30 corresponding to the orientation where the object is located, it is possible to distinguish the wave receiving signals caused by the acoustic waves reflected by each object even when a plurality of objects are located in the detectable area (object area) of the acoustic wave sensor. Consequently, the orientation where each object is located can be detected.

Hereupon, when the reverberation time included in the acoustic wave transmitted from the wave transmitting device 10 is longer similar to the acoustic wave transmitted from the wave transmitting device of piezoelectric device of the conventional acoustic wave sensor, a generation term of the waveform (the waveform at left hand in FIG. 3D and the waveform at right hand in FIG. 3G) which is the addition of the group of the wave receiving signals becomes longer. Consequently, the distinction between the object 21 and the object 22 may become difficult.

In the first embodiment, a thermally induced acoustic wave generator, which generates the acoustic wave by applying thermal impact to the air, is used as the wave transmitting device 10 serving as a sound source. Since the thermally induced acoustic wave generator generates the acoustic wave by converting a temperature change of a metal film to expansion and contraction of the air which is a medium, as described later, mechanical vibration rarely occurs in itself. Thus, a Q factor of resonance characteristic of the thermally induced acoustic wave generator is much smaller than the Q factor of the piezoelectric device. Consequently, an acoustic wave with a very short reverberation time can be transmitted from the thermally induced acoustic wave generator. In addition, an electric capacitance microphone, which has a Q factor of resonance characteristic much smaller than the Q factor of resonance characteristic of the piezoelectric device, and has a shorter generation term of the reverberation component included in the wave receiving signal, is used as the wave receiving device 30.

Figure 4:
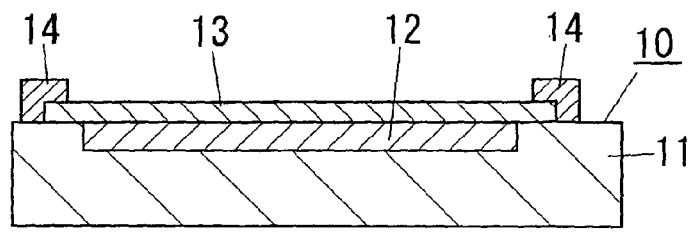
FIG. 4 is sectional view showing a configuration of a wave transmitting device in the above acoustic wave sensor.

As shown in FIG. 4, the wave transmitting device 10 is a thermally induced acoustic wave generator which is comprised of a base substrate 11 made of a single crystalline p-type silicon substrate, a thermal insulation layer (heat insulating layer) 12 made of porous silicon layer formed on a surface (upper surface in FIG. 4) of the base substrate 11, a heating conductor layer 13 made of metal thin film and formed on the thermal insulation layer 12, a pair of pads 14 electrically connected to the heating conductor layer 13, and so on. Planar shape of the base substrate 11 is form of rectangle, and planar shapes of the thermal insulation layer 12 and the heating conductor layer 13 each are formed of rectangle, too. In addition, the heating conductor layer 13 should be formed on at least one surface of the base substrate 11.

In the wave transmitting device 10 configured as above, when electric current is supplied between the pads 14 on both sides of the heating conductor layer 13, sudden temperature change occurs in the heating conductor layer 13, so that sudden temperature change (thermal impact) occurs in the air contacting with the heating conductor layer 13. In other words, the thermal impact is given to the air contacting with the heating conductor layer 13. The air coming in contact with the heating conductor layer 13 expands while a temperature rise of the heating conductor layer 13, and contracts while the temperature decline of the heating conductor layer 13. Therefore, an acoustic wave propagating in the air can be generated by controlling the energization to the heating conductor layer 13, appropriately.

As mentioned above, the thermally induced acoustic wave generator, which constitutes the wave transmitting device 10, generates the acoustic wave propagating in the air by converting the sudden temperature change of the heating conductor layer 13 corresponding to the energization thereto to the expansion and contraction of a medium (air). In the first embodiment, the heating conductor layer 13 is used as a heating conductor, but the thermally induced acoustic wave generator should have at least a heat conductor of thin plate shape. For example, a thin plate made of aluminum can be used for the heat conductor.

As an example, p-type silicon substrate is used for the base substrate 11, and the thermal insulation layer 12 is formed of porous silicon layer having porosity of about 60 to 70% in the wave transmission device 10. The porous silicon layer serving as the thermal insulation layer 12 can be formed by anodization of a part of the silicon substrate to be used for the base substrate 11 in an electrolytic solution which is a mixture of a hydrogen fluoride aqueous solution and ethanol.

The porous silicon layer formed by anodization includes a lot of micro crystallite silicon (nanocrystalline silicon), grain size of which is in an order of nanometer. In addition, thermal conductivity and heat capacity of the porous silicon layer becomes smaller as porosity rises. Therefore, it is possible to transmit the temperature change of the heating conductor layer 13 to the air effectively by making the heat conductivity and the heat capacity of the thermal insulation layer 12 smaller than those of the base substrate 11, and by making a product of the heat capacity of the thermal insulation layer 12 much smaller than those of the base substrate 11.

If effective heat exchange can be generated between the heating conductor layer 13 and the air, and beginning and the base substrate 11 can receive heat from the thermal insulation layer 12 efficiently, so that the heat from the thermal insulation layer 12 can be radiated effectively, it is possible to prevent that heat from the heat from heating conductor layer 13 is accumulated to the thermal insulation layer 12. It is generally known that the porous silicon layer having porosity of 60%, which is formed by anodization of a single crystalline silicon substrate having thermal conductivity of 148 W/(m·k) and heat capacity of $1.63\times10^6$ J/(m$^3$·k), has thermal conductivity of 1 W/(m·k) and heat capacity of $0.7\times10^6$ J/(m$^3$·k). In the first embodiment, the thermal insulation layer 12 is formed of a porous silicon layer having porosity of about 70%, thermal conductivity of 0.12 W/(m·k) and heat capacity of $0.5\times10^6$ J/(m$^3$·k).

As for the material of the heating conductor layer 13, a kind of high melting point metal such as tungsten, tantalum, molybdenum, iridium, aluminum, or the like can be used. In addition, as for the material of the base substrate 11, another semiconductor material which can be made porous by anodization such as Si, Ge, SiC, GaP, GaAs, InP, or the like can be used.

For the wave transmitting device 10, a thickness of the base substrate is made in a range of 300 to 700 μm, a thickness of the thermal insulation layer 12 is made in a range of 1 to 10 μm, a thickness of the heating conductor layer 13 is made in a range of 20 to 100 nm, and thickness of the pads 14 is made as 0.5 μm. In addition, the heating conductor layer 13 is set to have a wider side of 12 mm and a narrower side of 10 mm. Beside, these measures are examples, and they are not limited in particular.

In the wave transmitting device 10, the heating conductor layer 13 is heated by energization through the pads 14, and the acoustic wave is generated by the temperature change of the heating conductor layer 13. When a driving input waveform (a driving voltage waveform or a driving current waveform) applied to the heating conductor layer 13 is formed, for example, a sinusoidal waveform having a frequency f1, a frequency f2 of temperature oscillation generated in the heating conductor layer 13 becomes double of the frequency f1 of the driving input waveform, ideally. Thus, it is possible to generate the acoustic wave having a frequency about double of a frequency f1 of the driving input waveform from the wave transmitting device 10. In other words, since the wave transmitting device 10 has a flat frequency characteristic, it is possible to vary the frequency of the generated acoustic wave widely by changing the frequency f1 of the driving input waveform.

Figure 5A:
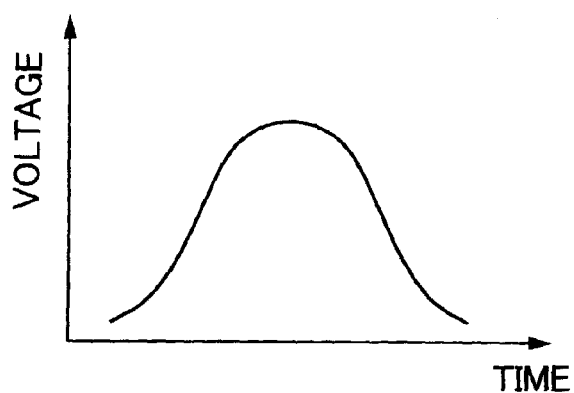
FIG. 5A is a graph showing a waveform of an example of a driving input waveform inputted into the wave transmitting device shown in FIG. 4.

In addition, when a solitary wave of half period of a sinusoidal waveform is applied as a driving input signal between the pads, an acoustic wave of about one period with little reverberation can be generated from the wave transmitting device 10. Alternatively, when a voltage waveform having a gauss waveform shown in, for example, FIG. 5A is applied between the pads 14 as a driving input waveform, an acoustic wave of a gauss waveform shown in FIG. 5B can be generated from the wave transmitting device 10. For generating an acoustic wave having about one period, a term of one period of the acoustic wave to be generated is set to be a term of one period of ultrasonic wave having a frequency in a range of 50 to 70 kHz. Beside, these numerals are not limited in particular. In addition, for generating an acoustic wave having a gauss waveform, a term while generation of the acoustic wave is set to be a term of one period of ultrasonic wave having a frequency in a range of 50 to 70 kHz.

Figure 5B:
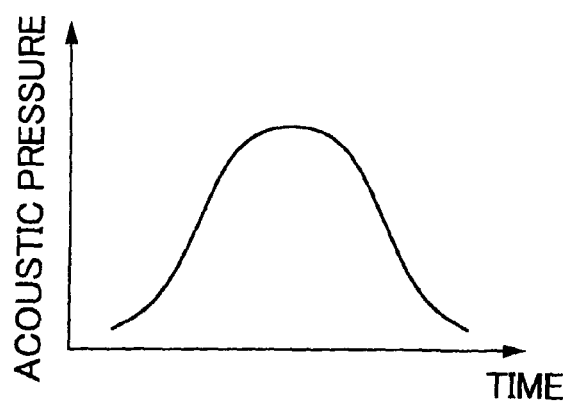
FIG. 5B is a graph showing a waveform of acoustic wave outputted from the wave transmitting device when the driving input waveform shown in FIG. 5A is inputted into the wave transmitting device.
Figure 6:
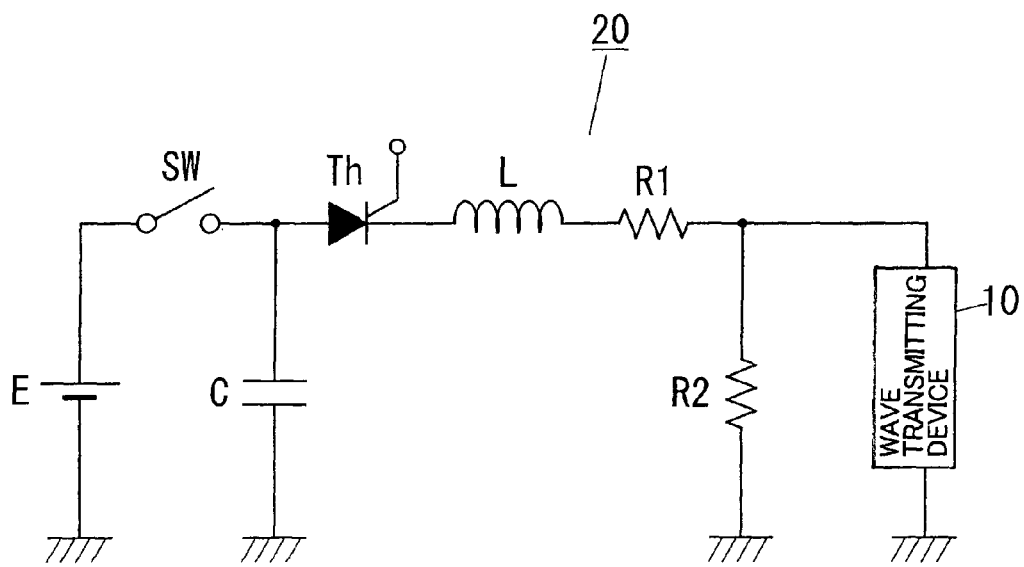
FIG. 6 is a circuit diagram showing a constitutional example of a driving circuit to drive the wave transmitting device in the first embodiment.

In order to generate the acoustic wave having a gauss waveform shown in FIG. 5B from the wave transmitting device 10, a circuit, for example, shown in FIG. 6 should be used as the driving circuit 20. The driving circuit 20 is configured by a DC power supply E, a capacitor connected between both terminals of the DC power supply E via a switch SW, a thyristor Th connected between both terminals of the capacitor C, and a series circuit of an inductor L, a resistor R1 and a protection resistor R2. The wave transmitting device 10 is connected between both terminals of the protection resistor R2. The driving circuit 20 further has a timing controller (not illustrated) for controlling the timing of transmission of the acoustic wave from the wave transmitting device 10, so that not only on/off of the switch SW but also the timing for applying the control signal to the thyristor Th are controlled by the timing controller.

In the driving circuit 20 of the configuration shown in FIG. 6, electric charge is accumulated in the capacitor C from the DC power supply E while the switch SW is switched on, so that the capacitor C is charged. Since the timing controller detects a voltage between both terminals of the capacitor C, when the voltage between the terminals of the capacitor C exceeds a predetermined threshold value, the timing controller switches off the switch SW and applies the control signal to a gate of the thyristor Th. When the control signal is applied to the thyristor Th from the timing controller, the thyristor Th turns on, and a voltage is applied between the pads 14 of the wave transmitting device 10. Then, the acoustic wave is generated corresponding to the temperature change of the heating conductor layer 13. By setting an inductance of the inductor L and a resistance of the resistor R1 to appropriate values, a driving voltage waveform having a gauss waveform shown in FIG. 5A can be applied between the pads 14 of the wave transmitting device 10.

Subsequently, the electric capacitance microphone constituting the wave receiving device 30 is described. The electric capacitance microphone is formed with utilizing micro machining technology. For example, shown in FIGS. 7A and 7B, the electric capacitance microphone comprises a rectangular frame 31 and a pressure receiving portion 32 of a cantilever provided on a surface of the frame 31. The frame 31 is formed by providing an opening 31a on a silicon substrate penetrating in thickness direction of the substrate. The pressure receiving portion 32 is formed to astride two sides of the frame 31 opposing each other.

A thermal oxidation film 35, a silicon oxide film 36 covering the thermal oxidation film 35, a silicon nitride film 37 covering the silicon oxide film 36 are formed on the surface of the frame 31. A fixed end of the pressure receiving portion 32 is held on the frame 31 via the silicon nitride film 37, and a free end of the pressure receiving portion 32 faces the silicon nitride film 37 with a gap in the thickness direction of the above silicon substrate.

A stationary electrode 33a made of, for example, metal thin film such as chromium film is formed on a portion facing the free end of the pressure receiving portion 32 on the silicon nitride film 37. Furthermore, a movable electrode 33b made of, for example, metal thin film such as chromium film is formed on a face at the free end of the pressure receiving portion 32 which does not face the silicon nitride film 37.

In addition, a silicon nitride film 38 is formed on the other face of the frame 31. The pressure receiving portion 32 is constituted by a silicon nitride film which is formed in different process from the above silicon nitride films 37 and 38.

In the wave receiving device 30 of the electric capacitance microphone shown in FIG. 7, a capacitor, which uses the stationary electrode 33a and the movable electrode 33b as electrode thereof, is formed. When the pressure receiving portion 32 receives a pressure of an acoustic wave, the pressure receiving portion 32 is displaced, so that a distance between the stationary electrode 33a and the movable electrode 33b varies, and the capacitance between the stationary electrode 33a and the movable electrode 33b also varies. When a DC bias voltage is applied between the pads (not illustrated) provided on the stationary electrode 33a and the movable electrode 33b, minute variation of the voltage occurs between the pads corresponding to the acoustic pressure caused by the acoustic wave, so that the acoustic wave can be converted to an electric signal.

Figure 7A:
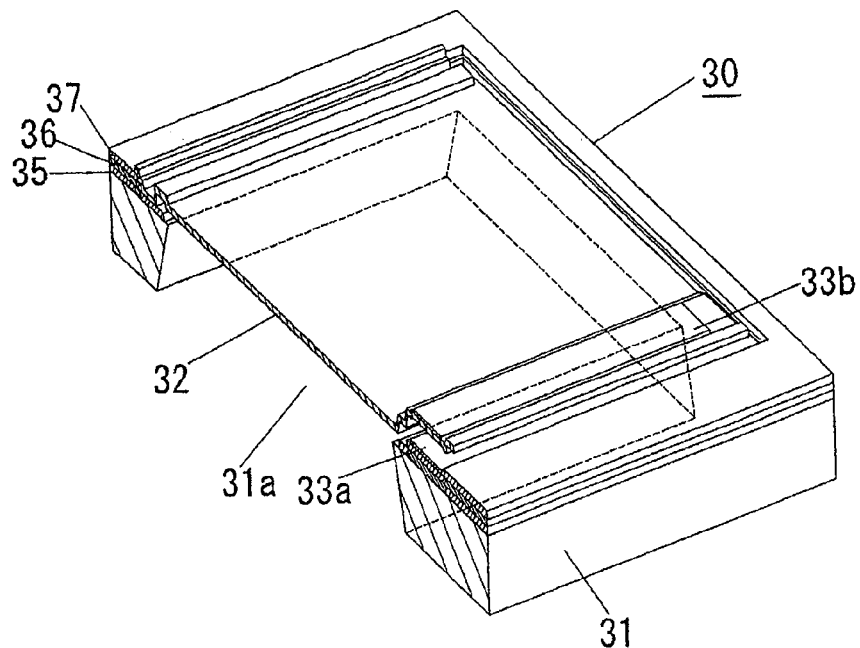
FIG. 7A is a partially broken perspective view showing a configuration of a wave receiving device in the first embodiment.
Figure 7B:
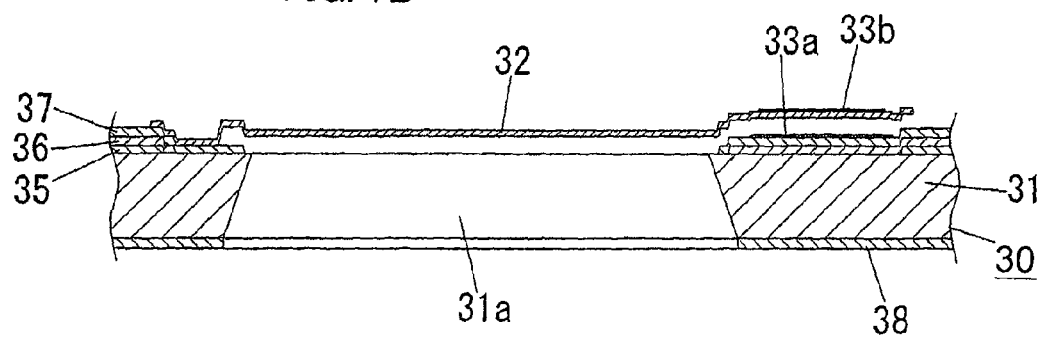
FIG. 7B is a sectional view of the wave receiving device of FIG. 7A.

The electric capacitance microphone used as the wave receiving device is not limited to the configuration shown in FIGS. 7A and 7B. It is possible to form a diaphragm for receiving the acoustic wave, a back plate opposing the diaphragm and having a plurality of exhaust holes, and a spacer for defining a distance between the diaphragm and the back plate when the diaphragm receives no acoustic wave by processing a silicon substrate by micro machining technology. A movable electrode is provided on the diaphragm and a stationary electrode is provided on the back plate.

Figure 8:
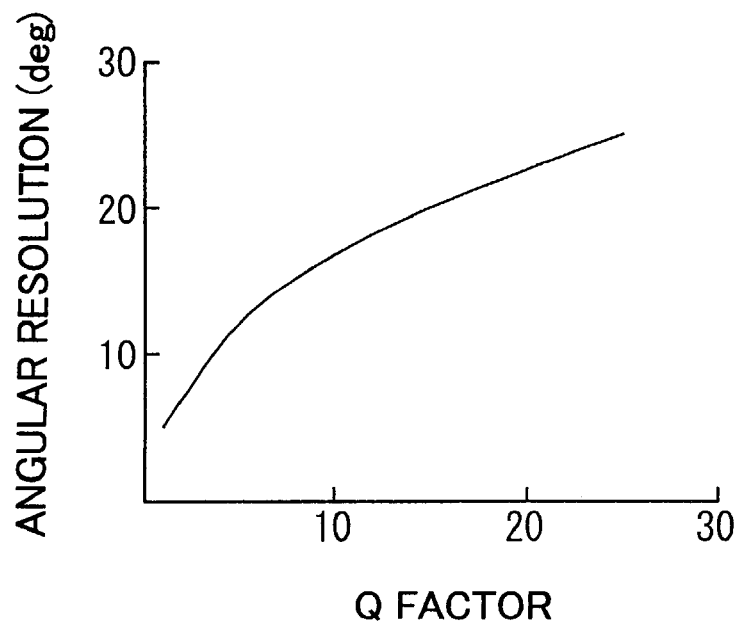
FIG. 8 is a graph showing a relation between Q factor of resonance characteristic and angular resolution of the acoustic wave sensor.

By the way, a Q factor of resonance characteristic of a thermally induced acoustic wave generator shown in FIG. 4 is about 1, and a Q factor of resonance characteristic of the electric capacitance microphone shown in FIGS. 7A and 7B is in a range of 3 to 4 extent. Both of these Q factors are much smaller than the Q factor of the piezoelectric device. Thus, when the thermally induced acoustic wave generator is used as the wave transmitting device 10 and the electric capacitance microphones are used as the wave receiving devices 30 in the first embodiment, angular resolution of the acoustic wave sensor can be increased largely, in comparison with the conventional acoustic wave sensor using the piezoelectric devices as the wave transmitting device and the wave receiving devices. A relation between the Q factor of resonance characteristic and the angular resolution of the device is shown in FIG. 8. As can be seen from FIG. 8, the angular resolution of the wave transmitting device 10 using the thermally induced acoustic wave generator is about 5 degrees, and the angular resolution of the wave receiving device 30 using the electric capacitance microphone is in a range of 9 to 10 degrees extent.

It is not necessary to use the electric capacitance microphones as the wave receiving devices 30 with the thermally induced acoustic wave generator used as the wave transmitting device 10, simultaneously. Even when only the thermally induced acoustic wave generator is used as the wave transmitting device 10 and the piezoelectric devices are used as the wave receiving devices 30 like the conventional acoustic wave sensor, or when only the electric capacitance microphones are used as the wave receiving devices 30 and the piezoelectric device is used as the wave transmitting device 10 like the conventional acoustic wave sensor, it is possible to increase the angular resolution of the acoustic wave sensor in comparison with the conventional acoustic wave sensor using the piezoelectric devices as the wave transmitting device and the wave receiving devices.

As described above, the acoustic wave sensor in the first embodiment uses an acoustic wave generating device generating an acoustic wave by applying thermal impact to the air as the wave transmitting device 10, so that the Q factor of resonance characteristic of the wave transmitting device 10 is much smaller than the Q factor of resonance characteristic of the piezoelectric device. Thus, a reverberation time included in the acoustic wave transmitted from the wave transmitting device 10 can be shortened in comparison with the case of using the piezoelectric device as the wave transmitting device like the conventional acoustic wave sensor. In other words, a term that the reverberation component occurs in the acoustic wave transmitted from the wave transmitting device 10 can be shortened in comparison with the conventional one.

Furthermore, electric capacitance microphones each converting acoustic pressure of an acoustic wave to variation of capacitance are used as the wave receiving devices 30, so that the Q factor of resonance characteristic of each wave receiving device 30 is much smaller than the Q factor of resonance characteristic of the piezoelectric device. Thus, a reverberation time included in the wave receiving signal outputted from each wave receiving device 30 can be shortened in comparison with the case of using the piezoelectric devices as the wave receiving devices like the conventional acoustic wave sensor. In other words, a term, during which the reverberation component included in the wave receiving signal outputted from each wave receiving device 30 occurs, can be shortened in comparison with the conventional one.

As a result, according to the acoustic wave sensor of the first embodiment, it is possible not only to shorten the dead zone caused by reverberation component included in the acoustic wave transmitted from the wave transmitting device 10 and the dead zone caused by reverberation component included in the wave receiving signals outputted from the wave receiving devices 30, but also the angular resolution of the acoustic wave sensor can be increased, in comparison with the conventional acoustic wave sensor which uses the piezoelectric devices as the wave transmitting device and the wave receiving devices and detects a distance to an object and an orientation where the object is located.

When the Q factors of resonance characteristics of the wave transmitting device 10 and the wave receiving devices 30 are equal to or smaller than 10, sufficient performance of the acoustic wave sensor can be provided. When the Q factors of them are equal to or smaller than 5, it is preferable. Though the acoustic wave sensor in the first embodiment is configured to detect both of the distance to the object 2 and the orientation where the object 2 is located, it is possible to configure the acoustic wave sensor for detecting only one of the distance to the object 2 and the orientation where the object 2 is located.

Second Embodiment

Figure 9:
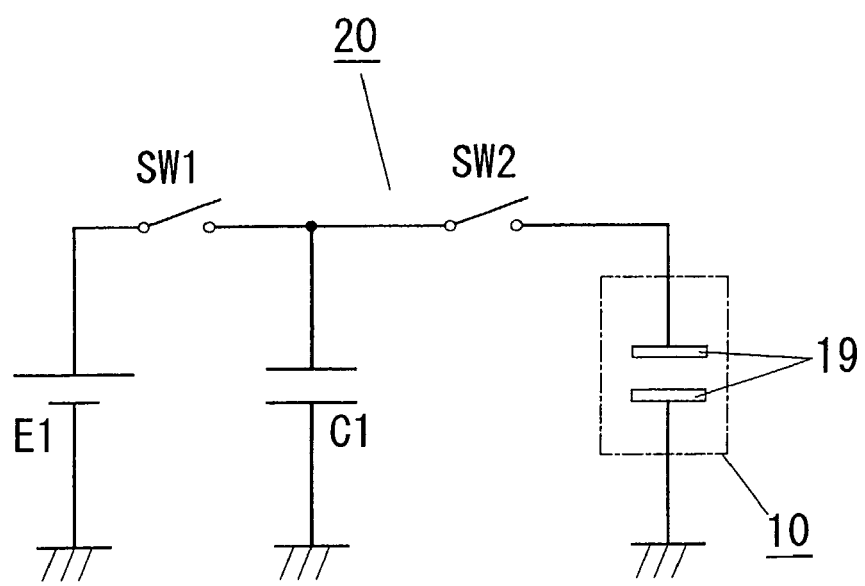
FIG. 9 is a circuit diagram showing configurations of a wave transmitting device and a driving circuit thereof in an acoustic wave sensor in accordance with a second embodiment of the present invention.

Subsequently, an acoustic wave sensor in accordance with a second embodiment of the present invention is described with reference to the figures. The second embodiment relates to the acoustic wave sensor for detecting both of a distance to an object and an orientation where the object is located in order to recognize three dimension locus of the object. Basic configuration of the acoustic wave sensor of the second embodiment is substantially the same as that of the acoustic wave sensor of the first embodiment, but configurations of a wave transmitting device 10 and a driving circuit 20 constituting the wave transmitter 1 are different, as shown in FIG. 9. Therefore, only the difference is explained, and illustration and description of the other configurations are omitted.

The wave transmitting device 10 in the second embodiment is a thermally induced acoustic wave generator generating an acoustic wave by thermal impact, and has a pair of electrodes 19 opposing with each other via a gap. When a spark discharge is generated by applying a predetermined voltage between the electrodes 19 of the wave transmitting device 10, thermal impact is applied to the air, so that an acoustic wave is generated. A Q factor of resonance characteristic of this wave transmitting device 10 is about 2. Therefore, an acoustic wave having a short occurrence term and a short reverberation time can be transmitted by the wave transmitting device 10 of the second embodiment.

The driving circuit 20 for driving the wave transmitting device 10 is configured in a manner so that a capacitor C1 is connected between both terminals of a DC power supply E via a charging switch SW1 for charging the capacitor C1, and the wave transmitting device 10 is connected between both terminals of the capacitor C1 via a discharging switch SW2 for discharging the capacitor C1. Furthermore, the driving circuit 20 has a timing controller (not illustrated) for controlling the timing of transmission of an acoustic wave from the wave transmitting device 10, similar to the case of the first embodiment, so that on/off of each of the charging switch SW1 and the discharging switch SW2 is controlled by the timing controller. In the driving circuit 20, the charging switch SW1 and the discharging switch SW2 are never switched on at the same time.

The capacitor C1 is charged while the charging switch SW1 is switched on. Since the timing controller detects a voltage between the capacitor C1, when the voltage between the terminals of the capacitor C1 exceeds a predetermined threshold value (for example, a spark voltage at which a spark discharge occurs between the electrodes 19 of the wave transmitting device 10), the timing controller switches off the charging switch SW1, subsequently, the timing controller switched on the discharging switch SW2.

In the driving circuit 20 shown in FIG. 9, electric charge is accumulated in the capacitor C1 from the DC power source E. When the voltage between both terminals of the capacitor C1 exceeds the predetermined threshold value, a control signal is applied to the discharging switch SW2 from the timing controller, so that the discharging switch SW2 is switched on. Thus, a voltage equal to or larger than the spark voltage is applied between both terminals 19 of the wave transmitting device 10, and the spark discharge occurs. Thermal impact is given to the air in a circumference of the terminals 19 by the spark discharge between the electrodes 19, so that an acoustic wave is generated by expansion and contraction of the air. The acoustic wave can be generated in omnidirectional by the spark discharge on a plane perpendicular to a direction where the electrodes 19 opposing each other. In addition, the acoustic wave generated by the spark discharge includes frequency components of a relatively broad band.

Third Embodiment

Subsequently, an acoustic wave sensor in accordance with a third embodiment of the present invention is described. The third embodiment relates to the acoustic wave sensor for detecting both of a distance to an object and an orientation where the object is located in order to recognize three dimension locus of the object. Basic configuration of the acoustic wave sensor of the third embodiment is substantially the same as that of the acoustic wave sensor of the first embodiment, but configurations of a wave transmitting device 10 and a driving circuit 20 constituting the wave transmitter 1 are different. Therefore, only the difference is explained.

In a wave transmitter 1 of the third embodiment, a thermally induced acoustic wave generator used as the wave transmitting device 10 comprises a member to be heated having a low heat capacity and a low heat conductance, and a laser device such as a semiconductor laser for heating the member to be heated by irradiation of a laser beam (not illustrated because of obviousness). The driving circuit 20 controls the driving of the laser device so as to heat the member to be heated, so that an acoustic wave is generated by applying thermal impact to the air contacting with the member to be heated. According to the acoustic wave sensor of the third embodiment, it is possible to transmit the acoustic wave having a short occurrence term and a short reverberation time can be transmitted by the wave transmitting device 10.

Fourth Embodiment

Figure 10A:
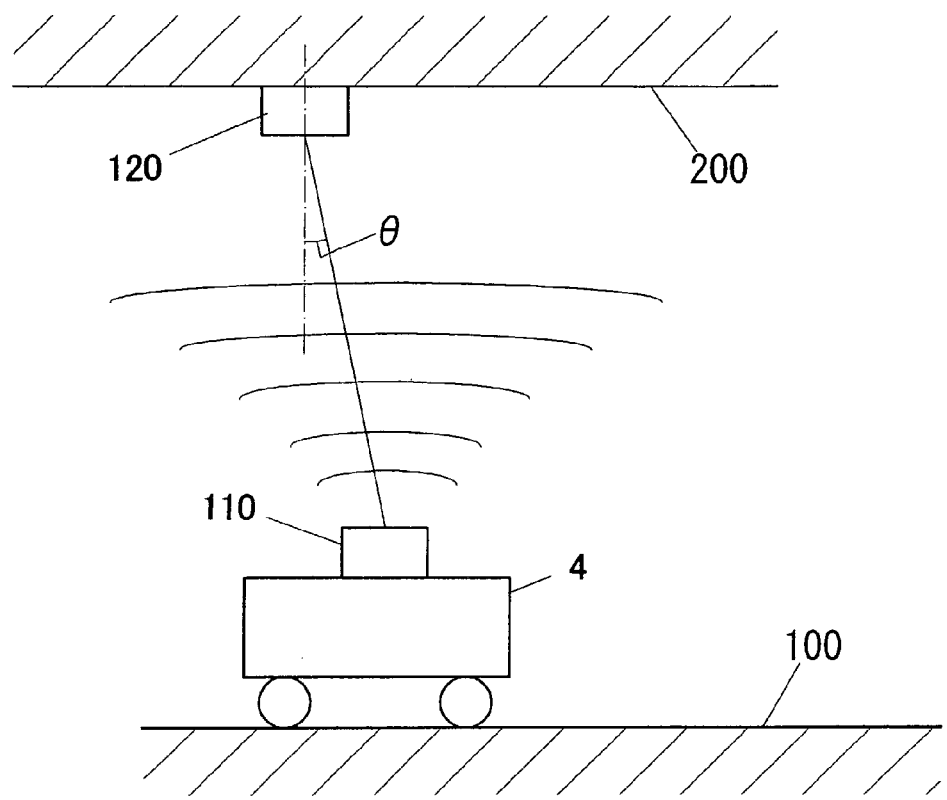
FIG. 10A is a drawing showing a configuration of a position detecting system in accordance with a fourth embodiment of the present invention.

Subsequently, a position detecting system using an acoustic wave sensor in accordance with a fourth embodiment of the present invention is described with reference to figures. In the position detecting system shown in FIG. 10A, a migration object 4 such as a shopping cart which moves on a floor 100 in a building is assumed as an object to be detected. Such a position detecting system can detect positions of a plurality of migration object 4 simultaneously, so that each migration object 4 has inherent identification information.

On the migration object 4, a wave transmitting unit 110 comprising a wave transmitter 1 having a wave transmitting device 10 serving as a sound source which can transmit an acoustic wave and a driving circuit 20 for intermittently driving the wave transmitting device 10 is mounted. On the other hand, a wave receiving unit 120 comprising a wave receiver 3 having a plurality of wave receiving devices 30 for receiving the acoustic wave intermittently transmitted from the wave transmitter 1 is disposed at a predetermined position on a ceiling 200 of the building.

The position detecting system of the fourth embodiment is a circulation measuring system which demands a relative position of the wave transmitter 1 with respect to the wave receiver 3 as a relative position of the migration object 4 for measuring a circulation for tracing a migration of the migration object 4. It uses a thermally induced acoustic wave generator, which is, for example, used in the first embodiment, as for the wave transmitting device 10, and uses a driving circuit 20 having substantially the same configuration in the first embodiment. It, however, is not limited to these examples, and the configurations of the wave transmitting device 10 and the driving circuit 20 described in the second and third embodiments can be used.

Figure 11:
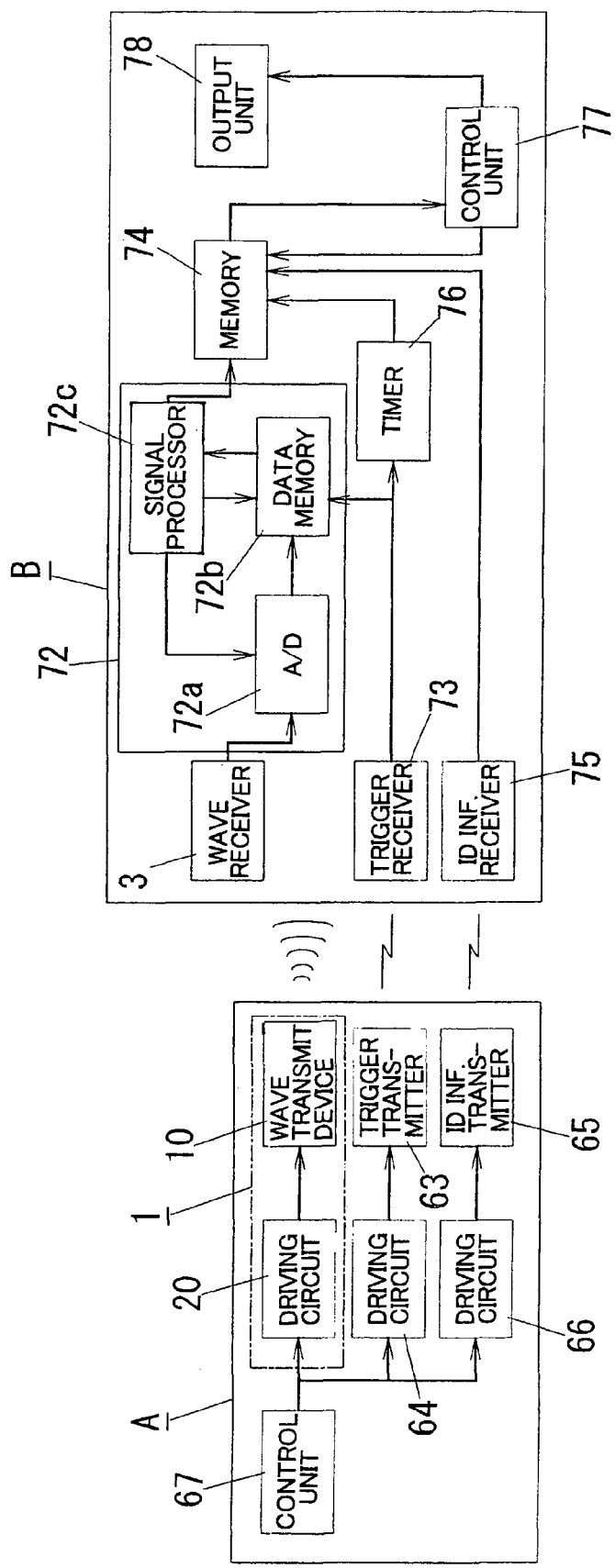
FIG. 11 is a block diagram showing configurations of a wave transmitter unit and a wave receiver unit in above position detecting system.

As shown in FIG. 11, the wave transmission comprises a unit 110 comprises a trigger signal transmitter 63 for transmitting a trigger signal with using a light or a radio wave, a driving circuit 64 for driving the trigger signal transmitter 63, an identification information signal transmitter 65 for transmitting an inherent identification information signal with using light, radio wave or acoustic wave, a driving circuit 66 for driving the identification information signal transmitter 65, and a control unit 67 for controlling the driving circuits 20, 64 and 66, further to the above-mentioned wave transmitting device 10 and the driving circuit 20 for driving the wave transmitting device 10.

Timing for starting transmission of an acoustic wave from the wave transmitter 1, timing for starting transmission of a trigger signal from the trigger signal transmitter 63, and timing for transmitting an identification information signal from the identification information signal transmitter 65 are controlled by the control unit 67. The control unit 67 is mainly comprised of a microcomputer, and the above each function of the control unit 67 is realized by executing an appropriate program in the microcomputer.

The wave receiving unit 120 comprises the wave receiver 3, a trigger signal receiver 73 for outputting a trigger receiving signal when it receives the trigger signal transmitted from the trigger signal transmitter 63, an identification signal receiver 75 for identification information signal transmitter 65, a position calculator 72 for calculating and outputting a relative position of the wave transmitter 1 with respect to the wave receiver 3 (an orientation where the wave transmitter 1 is located and a distance to the wave transmitter 1) on the basis of wave receiving signals outputted from the wave receiver 3 and the trigger receiving signal outputted from the trigger signal receiver 73, a timer 76 for outputting a time when it receives the trigger receiving signal from the trigger signal receiver 73 (hereinafter abbreviated as trigger receiving time), and a memory 74 for memorizing result of calculation (the orientation where the wave transmitter 1 is located and the distance to the wave transmitter 1) outputted from the position calculator 72 in time-series homologizing with the trigger receiving time outputted from the timer 76.

The trigger receiving time memorized in the memory 74, the orientation where the wave transmitter 1 is located and a distance to the wave transmitter 1 at each trigger receiving time (that is, data relating to variation of relative position on the wave transmitter 1 mounted on each migration object 4 in time-series) are converted to data array of data transmission form of an output unit 78 by a control unit 77 so as to be outputted to an administration apparatus such as an external computer through the output unit 78. As for the output unit 78, for example, a serial transmission interface such as TIA/EIA-232-E or USB, or a parallel transmission interface such as SCSI can be used. The above function of the control unit 77 is realized by executing an appropriate program in the microcomputer.

When light is used as the trigger signal, for example, a light emitting diode is used for the trigger signal transmitter 63. Alternatively, when radio wave is used as the trigger signal, for example, a radio wave transmitter is used for the trigger signal transmitter 63. Since light and radio wave are much faster than acoustic wave, a term for arriving light or radio wave can be regarded as zero in a time region while an acoustic wave reaches from the wave transmitting unit 110 to the wave receiving unit 120.

When light is used as the identification information signal, for example, a light emitting diode is used for the identification information signal transmitter 65. Alternatively, when radio wave is used as the identification information signal, for example, a radio wave transmitter is used for the identification information signal transmitter 65. Furthermore, when acoustic wave is used as the identification information signal, for example, the thermally induced acoustic wave generator is used for the identification information signal transmitter 65.

Figure 10B:
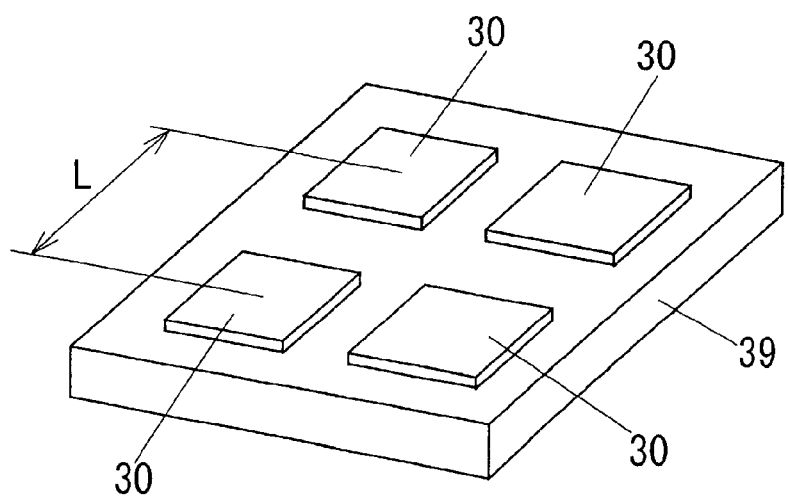
FIG. 10B is a perspective view showing a configuration of a wave receiving device used in the above position detecting system.

As shown in FIG. 10B, the wave receiver 3 of the wave receiving unit 120 has a plurality of wave receiving devices 30 (in the figure, four devices are illustrated as an example) each for receiving an acoustic wave transmitted from the wave transmitting device 10 and for transmitting the received acoustic wave to a wave receiving signal of an electric signal. Each wave receiving device 30 is two-dimensionally arranged on the same substrate 39. A distance L (a pitch of arrangement) between the centers of the wave receiving devices 30 is desirable to be set to a wavelength extent of an acoustic wave generated by the wave transmitting device 10 (for example, 0.5 to 5 times of the wavelength of the acoustic wave). If the distance L between the centers of the wave receiving devices 30 is shorter than a half of the wavelength of the acoustic wave, a time difference between the times when the acoustic waves reach to adjoining two wave receiving devices 30 becomes too short to detect the time difference. As for the wave receiving devices 30, for example, the above electric capacitance microphones as described in the first embodiment can be used. Since the electric capacitance microphone has a Q factor much smaller than that of the piezoelectric device, it is possible to make a region of frequency of receivable acoustic waves.

When light is used as the trigger signal transmitted from the trigger signal transmitter 63, for example, a photo-diode is used for the trigger signal receiver 73. Alternatively, when radio wave is used as the trigger signal, for example, a radio wave receiving antenna is used for the trigger signal receiver 73. As for the trigger signal receiver 73, an apparatus, which can receive the trigger signal, convert the trigger signal to an electric signal (trigger receiving signal) and output the electric signal, can be used.

When light is used as the identification information signal transmitted from the identification information signal transmitter 65, for example, a photo-diode is used for the identification information signal receiver 75. Alternatively, when radio wave is used as the identification information signal, for example, a radio wave receiving antenna is used for the identification information signal receiver 75. Furthermore, when acoustic wave is used as the identification information signal, for example, an electric capacitance microphone is used for the identification information signal receiver 75. As for the identification information signal receiver 75, an apparatus, which can receive the identification information signal, convert the identification information signal to identification information of electric signal and output the electric signal, can be used.

The position calculator 72 has a function for demanding an azimuth angle θ where the wave transmitter 1 is located with respect to the wave receiver 3 (an orientation from which an acoustic wave arrives) on the basis of the phase difference between the acoustic waves received by the wave receiving devices 30 of the wave receiver 3 and the arrangement of the wave receiving devices 30.

Subsequently, the position calculator 72 is described. In order to simplify the description, the wave receiving devices 30 of the wave receiver 3 is illustrated to be arranged one-dimensionally on the same plane as shown in FIG. 12. In addition, FIG. 12 is substantially the same as FIG. 2 except a number of the wave receiving devices 30.

FIGS. 13A to 13C respectively show the wave receiving signals of the wave receiving devices 30 shown in FIG. 12 when a driving voltage having a waveform of a half period of a sinusoidal waveform is applied to the heating conductor layer 13 of the thermally induced acoustic wave generator constituting the wave transmitting device 10. FIG. 13A shows the waveform of the wave receiving signal outputted from the wave receiving device 30 disposed at uppermost position in FIG. 12. FIG. 13B shows the waveform of the wave receiving signal outputted from the wave receiving device 30 disposed at middle position in FIG. 12. FIG. 13C shows the waveform of the wave receiving signal outputted from the wave receiving device 30 disposed at undermost position in FIG. 12.

The position calculator 72 comprises a signal processor 72c having a function for detecting an orientation where the wave transmitter 1 is located with respect to the wave receiver 3 (an orientation from which the acoustic wave arrives) on the basis of the phase difference of the acoustic waves received by the wave receiving devices 30 of the wave receiver 3 and the arrangement of the wave receiving devices 30.

The signal processor 72c comprises a delay function for delaying the wave receiving signals which are electric signals outputted from the wave receiving devices 30 of the wave receiver 3 in predetermined delay times corresponding to an arrangement pattern of the wave receiving devices 30 and for outputting the delayed wave receiving signals as a group, an adding function for adding each group of the delayed wave receiving signals, and a judging function for comparing a magnitude relation between a peak value of an output waveform of the added and delayed wave receiving signals and a predetermined threshold value and for judging an orientation corresponding to a delay time which is set at a time when a peak value exceeds to the threshold value appears as the orientation where the wave transmitter 1 is located (the orientation from which the acoustic wave arrives).

The position calculator 72 comprises an A/D converter 72a for converting an analogue wave receiving signal outputted from each wave receiving device 30 of the wave receiver 3 to a digital wave receiving signal and outputting the converted digital wave receiving signal, and a data memory 72b for memorizing outputs from the A/D converter 72a in a predetermined wave receiving term from a time when the trigger receiving signal from the trigger signal receiver 73 is inputted, further to the signal processor 72c.

The signal processor 72c sets a wave receiving term when the trigger receiving signal is inputted to the data memory 72b, and drives the A/D converter 72a only while the wave receiving term for obtaining an orientation where the wave transmitter 1 is located with using the data of wave receiving signals stored in the data memory 72b while the wave receiving term. The signal processor 72c is configured by a microcomputer and so on. In addition, [a number of wave receiving devices 30]×[a number of data of signal receiving signals from each wave receiving device] of data are stored in the data memory 72b.

Figure 14:
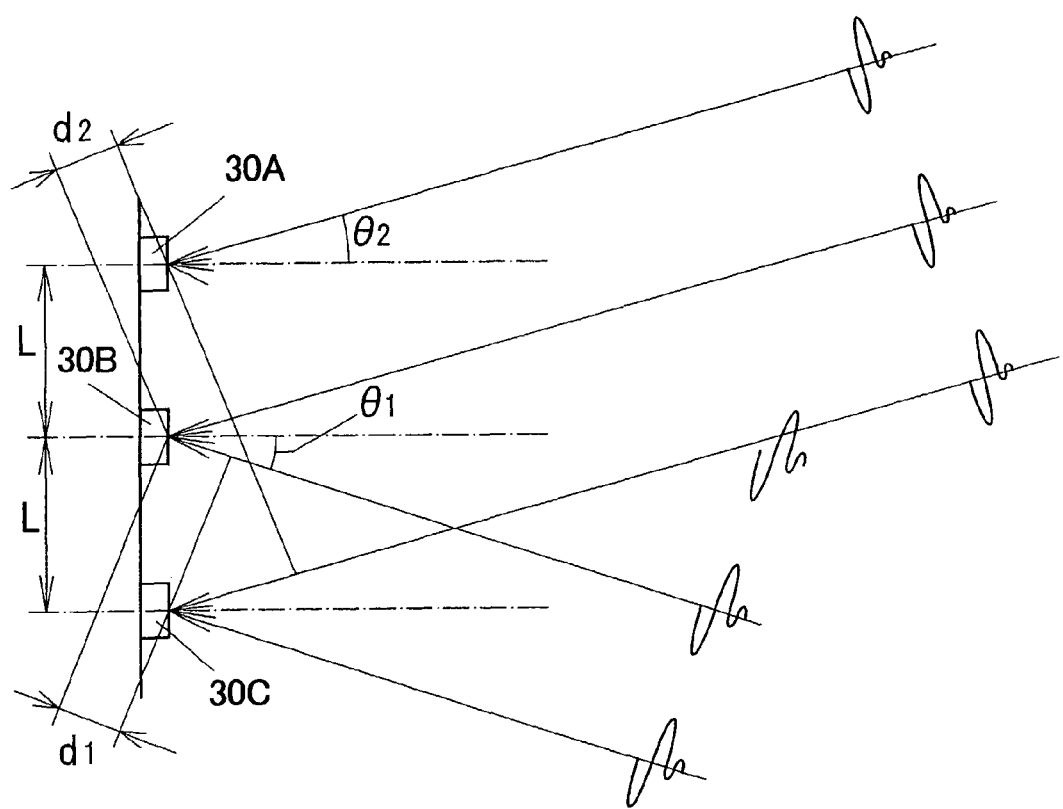
FIG. 14 is a drawing showing a case in which acoustic waves arrive at the wave receiving devices from two orientations in the position detecting system of the fourth embodiment.
Figure 15:
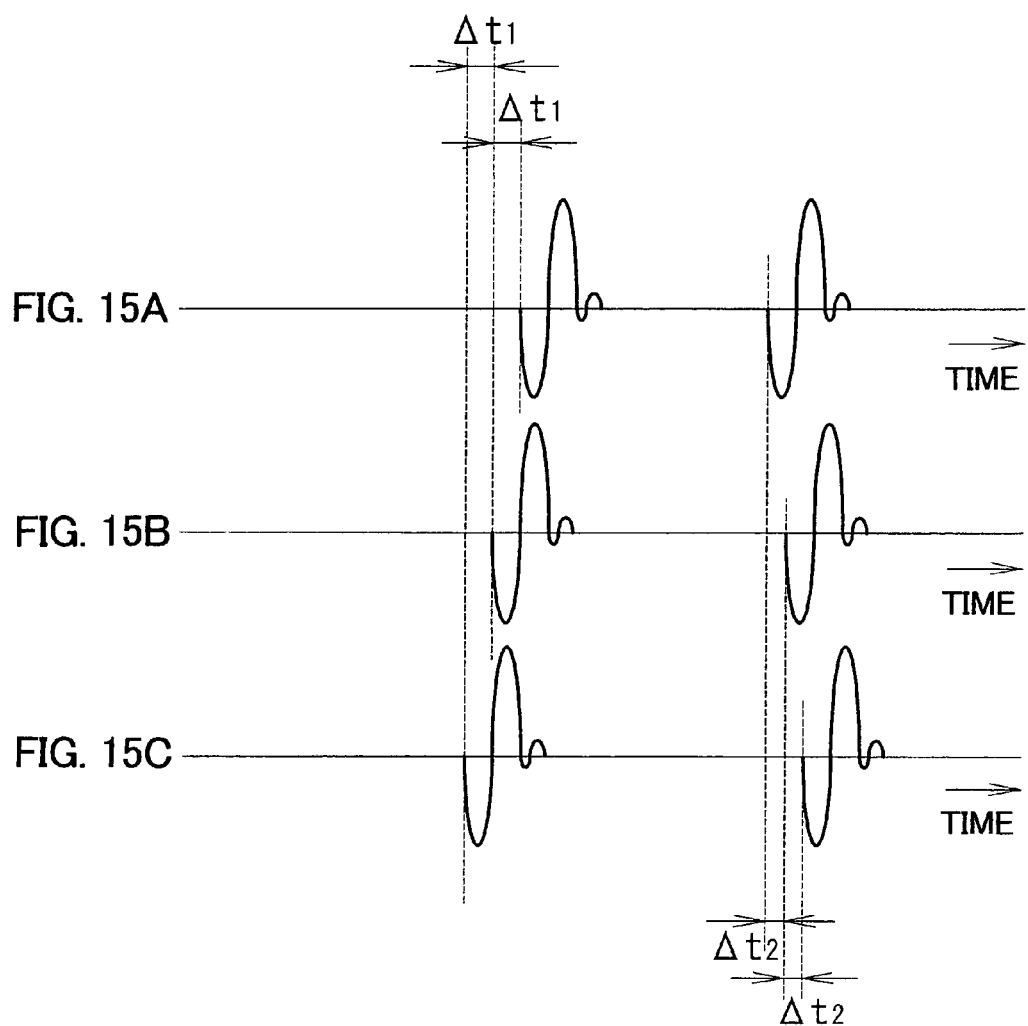
FIGS. 15A to 15C are waveform diagrams showing wave receiving signals outputted from the wave receiving devices of FIG. 14.

In the position detecting system of the fourth embodiment, a thermally induced acoustic wave generator is used as the wave transmitting device 10 of the wave transmitter 1. Therefore, it is assumed that the acoustic waves arrive at the wave receiver 3 from two orientations as shown in FIG. 14, and the acoustic waves from the orientation having an azimuth angle θ1 arrives earlier than the acoustic waves from the orientation having the azimuth angle θ2. As shown in FIGS. 15A to 15C, two groups of wave receiving signals rarely overlap each other. As a result, the azimuth angles θ1 and θ2 where the wave transmitters 1 mounted on the migration objects 4 are located (orientation from which the acoustic waves arrive) can be obtained.

FIG. 15A shows waveforms of two wave receiving signals of the wave receiving device 30A at uppermost position in FIG. 14. FIG. 15B shows waveforms of two wave receiving signals of the wave receiving device 30B at middle position in FIG. 14. FIG. 15C shows waveforms of two wave receiving signals of the wave receiving device 30C at undermost position in FIG. 14. The waveform disposed at left hand in each of FIGS. 15A to 15C corresponds to the acoustic wave arriving from the orientation having the azimuth angle θ1, and the waveform disposed at right hand corresponds to the acoustic wave arriving from the orientation having the azimuth angle θ2.

When a distance (delay distance) between a wave front of the acoustic wave which will arrive at a wave receiving device 30B and a center of adjoining another wave receiving device 30C when the acoustic wave arrives at the wave receiving device 30C is designated by a symbol "d1" (see FIG. 14), a time difference $\Delta t1$ necessary for arriving the wave front of the acoustic wave at the wave receiving device 30B (see FIGS. 15A to 15C) is calculated by the equation $\Delta t1 = d1/c = L \cdot \sin \theta 1/c$. On the other hand, when a distance (delay distance) between a wave front of the acoustic wave which will arrive at a wave receiving device 30B and a center of adjoining another wave receiving device 30A when the acoustic wave arrives at the wave receiving device 30A is designated by a symbol "d2" (see FIG. 14), a time difference $\Delta t2$ necessary for arriving the wave front of the acoustic wave at the wave receiving device 30B (see FIGS. 15A to 15C) is calculated by the equation $\Delta t2 = d2/c = L \cdot \sin \theta 2/c$.

Figure 16:
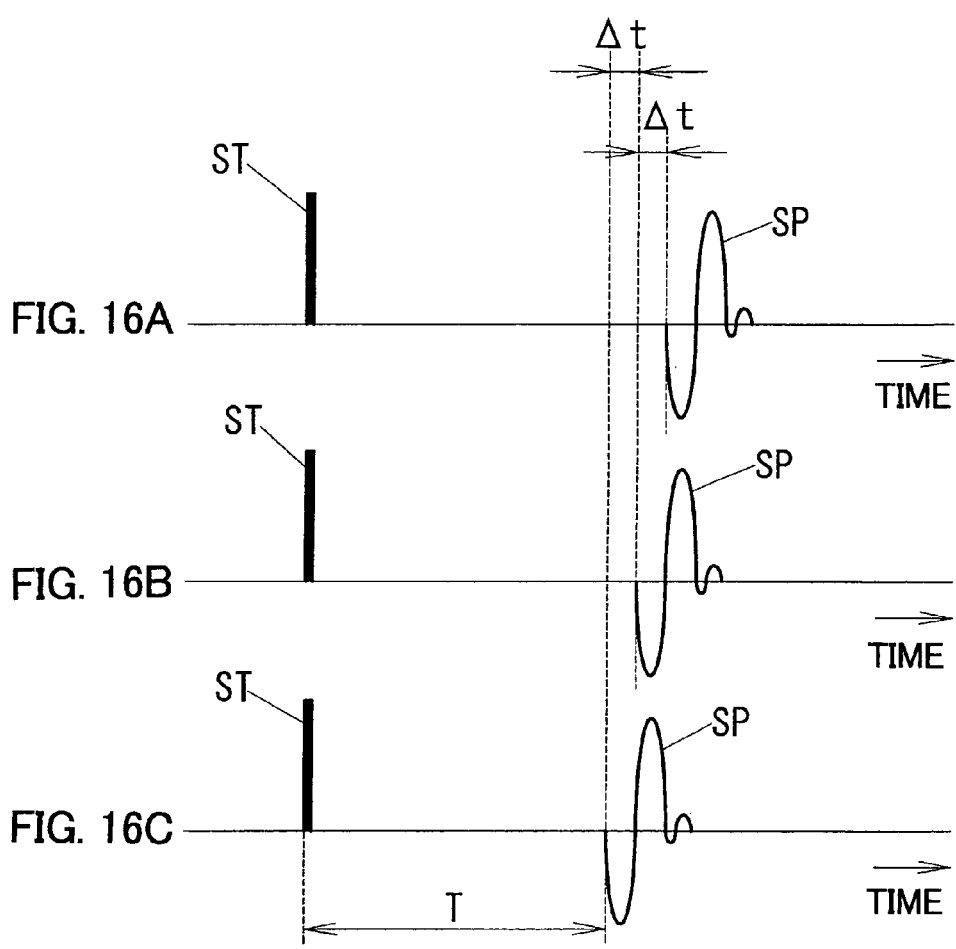
FIGS. 16A to 16C are waveform diagrams each showing a relation between a trigger signal ST and a wave receiving signal outputted first from each wave receiving device after receiving the trigger signal ST.
Figure 17:
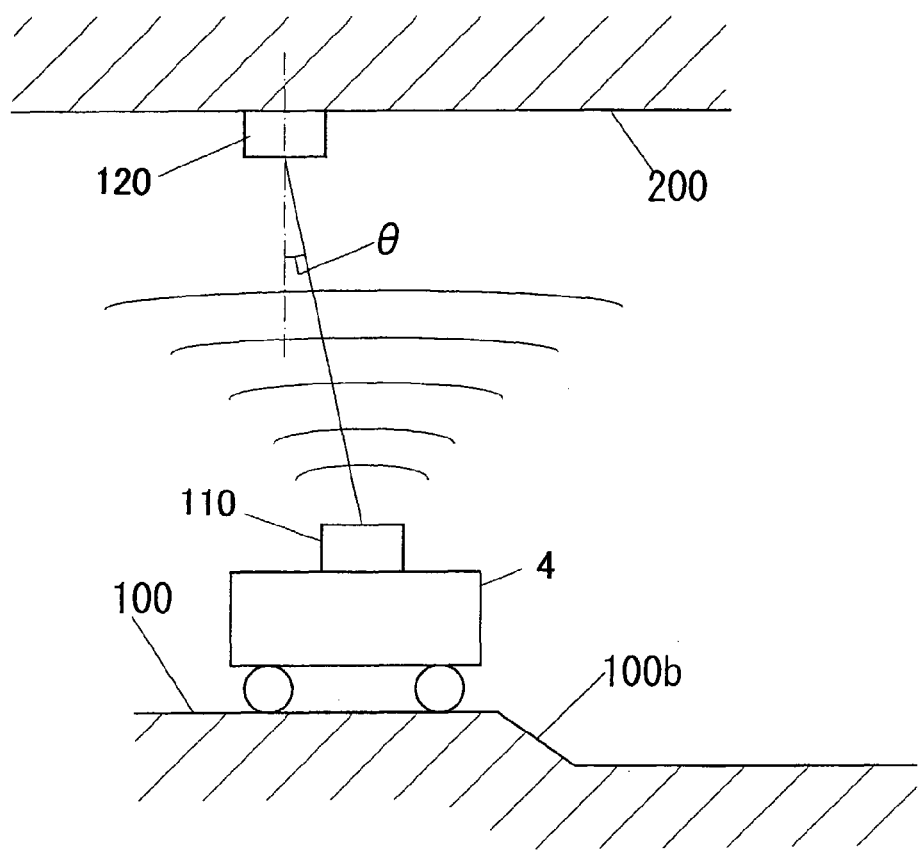
FIG. 17 is a drawing showing another case in which there is a step in floor of a building in the position detecting system of the fourth embodiment.
Figure 18:
FIGS. 18A to 18D are waveform diagrams each showing an identification information signal comprised of pulse strings different each used for as an identification information signal of each migration object.

The signal processor 72c of the position calculator 72 comprises a distance calculating function for calculating a distance from the wave receiver 3 to the wave transmitter 1 from a relation between a time when the trigger signal is received by the trigger signal receiver 73 and a time when the acoustic waves are received by the wave receiving devices 30. Since a signal such as light or radio wave which is much faster than acoustic wave is used as the trigger signal, a term necessary for transmitting the trigger signal from the wave transmitting unit 110 to the wave receiving unit 120 is vanishingly shorter. The signal processor 72 calculates the distance between the wave receiver 3 and the wave transmitter 1 with using a time difference T from a time when the trigger signal ST is received to a time when the wave receiving signal SP is received first after receiving the trigger signal ST as shown in FIGS. 16A to 16C and acoustic velocity. The distance calculating function of the signal processor 72c can be realized by executing an appropriate program with a microcomputer constituting the signal processor 72c.

In the above-mentioned position detecting system of the fourth embodiment, orientations where the wave transmitters 1 mounted on the migration objects 4 in a detectable area around a wave receiver 3 of a wave receiving unit 120 installed on a ceiling 200 can be detected. In comparison with the conventional position detecting system in which a plurality of acoustic wave receivers (wave receivers) are installed on the ceiling with predetermined distances, the application of the position detecting system becomes easier, and the arrangement of the wave receivers 3 becomes easier.

In the acoustic wave sensor in the position detecting system of the fourth embodiment, an acoustic wave generating device, which generates an acoustic wave by applying thermal impact to the air, and has a Q factor of resonance characteristic much smaller than that of a piezoelectric device, is used as the wave transmitting device 10, and electric capacitance microphones each having a Q factor of resonance characteristic much smaller than that of the piezoelectric device are used as the wave receiving devices 30. Thus, in comparison with the case of using the piezoelectric devices as both of the wave transmitting device and the wave receiving devices, it is possible not only to shorten a dead zone caused by reverberation component included in an acoustic wave transmitted from the wave transmitting device 10 and a dead zone caused by reverberation component included in wave receiving signals outputted from the wave receiving devices 30, but also to increase angular resolution of the acoustic wave sensor.

When a floor 100 is flat and a height from the floor 100 to a ceiling 200 is constant in a building to which the position detecting system of the fourth embodiment is applied, and a size of migration objects 4 are constant (that is a height from the floor 100 to an upper face of the migration objects 4 are constant), a distance between a plane including a wave receiver 3 and parallel to the ceiling 200 and a plane including a wave transmitter 1 and parallel to the ceiling 200 becomes constant with no relation to a position of the migration object 4 on the floor 100. Thus, when such a constant distance is previously memorized into a memory of a microcomputer as known distance information (height information), it is possible to obtain a distance between the wave receiver 3 and the wave transmitter 1 from the distance information and an orientation where the wave transmitter 1 is located.

On the other hand, even when a step 100b exists on the floor 100, it is possible to obtain a distance between the wave receiver 3 of the wave receiving unit 120 and the wave transmitter 1 of the wave transmitting unit 110 precisely by the signal processor 72c on the basis of a relation between a time when the trigger signal is received by the trigger signal receiver 73 and a time when acoustic waves are received by the wave receiving devices 30.

The control unit 77 has a sound source identifying function for identifying the wave transmitter 1 mounted on each migration object 4 individually on the basis of the identifying information outputted from the identification information signal receiver 75 and memorized in the memory 74. Thus, even when a plurality of migration objects 4 is located in a detectable area in which the wave receiver 3 can receive acoustic waves, relative positions of the wave transmitters 1 with respect to the wave receiver 3, that is the relative positions of the migration objects 4 can be obtained.

For example, when four migration objects 4 are located, it is possible to use identification information signals respectively comprised of different pulse arrays, as shown in FIGS. 18A to 18D can be used as the identification information signals transmitted from the identification information signal transmitters 65 of the wave transmitting units 110 of the migration objects 4. In such a case, the results of calculation by the signal processor 72c of the position calculator 72 are memorized in the memory 74 in compliance with the identification information. In the control unit 77, an orientation where a wave transmitter 1 is located (an orientation from which acoustic waves arrive) and a distance between the wave receiver 3 and the wave transmitter 1 obtained by the position calculator 72 can be distinguished from which wave transmitting units 110.

Figure 19:
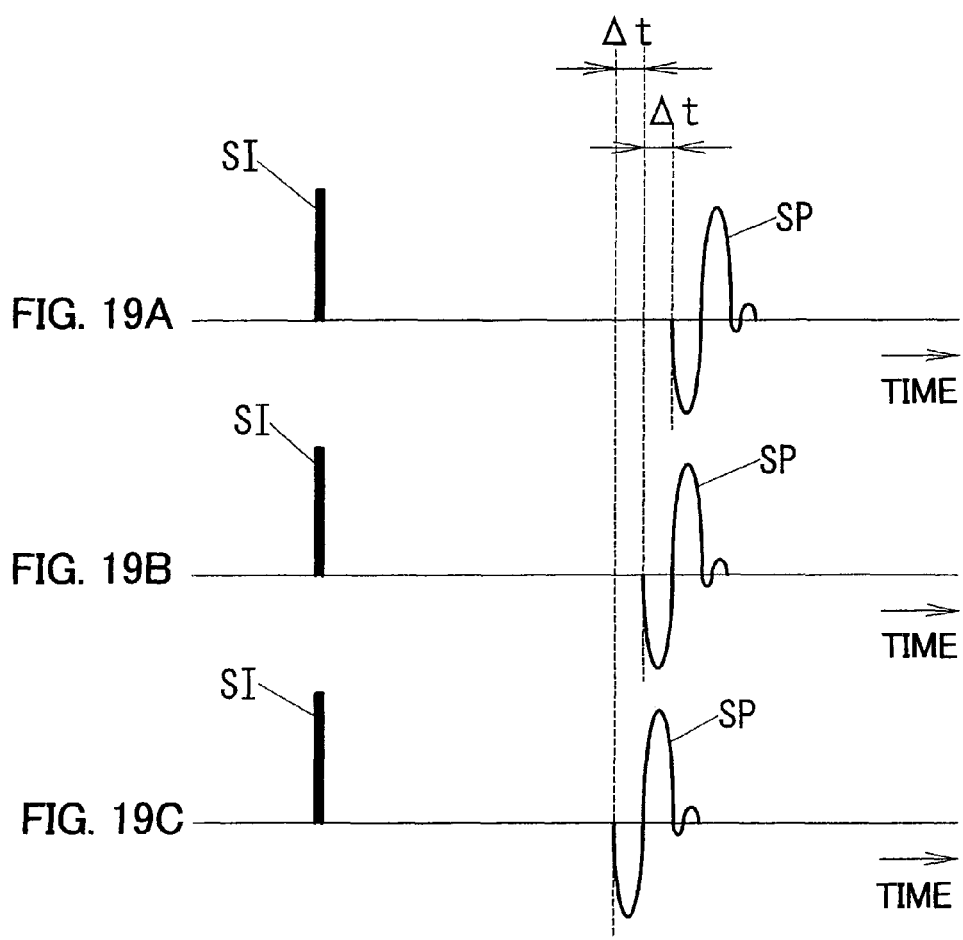
FIGS. 19A to 19C are waveform diagrams each showing a relation between the identification information signal outputted from an identification information signal receiver and a wave receiving signal outputted from each wave receiving device when a migration object is located in an area where a wave receiver can detect acoustic wave with using light or electric wave as the identification information signal.
Figure 20:
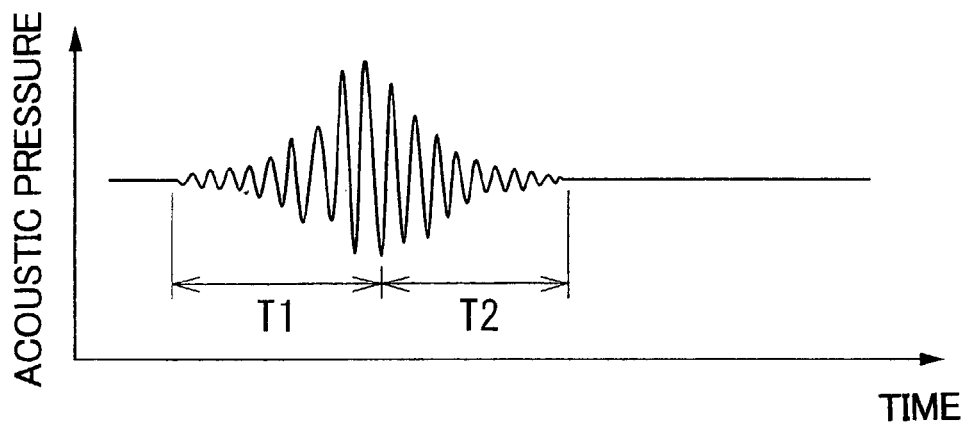
FIG. 20 is a waveform diagram showing vibration waveform of acoustic wave generated by a piezoelectric device when the piezoelectric device is intermittently driven.

Furthermore, when it is assumed that light or radio wave is used as the identification information signal, and only one wave transmitting unit 110 is located in a detectable area of the wave receiver 3 in which the wave receiver 3 can receive the acoustic waves, relations between the identification information outputted from the identification information signal receiver 75 and the wave receiving signals outputted from the wave receiving devices 30 of the wave receiving unit 120 are shown in FIGS. 19A to 19C. FIG. 19A shows a waveform of the wave receiving signal of the wave receiving device 30 at uppermost position in FIG. 12. FIG. 19B shows a waveform of the wave receiving signal of the wave receiving device 30 at middle position in FIG. 12. FIG. 19C shows a waveform of the wave receiving signal of the wave receiving device 30 at undermost position in FIG. 12. In this case, the identification information signal transmitter 65 can serve as the above trigger signal transmitter 63, and the identification information signal SI can be used as a trigger signal. Furthermore, it is possible to provide the above sound source identifying function into the position calculator 72.

In the position detecting system of the fourth embodiment, the trigger signal transmitter 63 is provided on the wave transmitting unit 110 and the trigger signal receiver 73 is provided on the wave receiving unit 120, but the configuration of the position detecting system is not limited to this. Contrary to the above-mentioned description, it is possible to provide the trigger signal transmitter 63 on wave receiving unit 120, and the trigger signal receiver 73 is provided on the wave transmitting unit 110. In such a case, the control unit 67 of the wave transmitting unit 110 controls the driving circuit 20 so that an acoustic wave is transmitted from the wave transmitting device 10 on the basis of the output from the trigger signal receiver 73, and the signal processor 72c of the position calculator 72 obtains a distance to the wave transmitter 1 from relations between a time when a trigger signal is transmitted from the trigger signal transmitter 63 and times when acoustic waves are received by the wave receiving devices 30. Furthermore, it is possible to constitute the control unit 67 of the wave transmitting unit 110 so that it drives the driving circuit 20 just after receiving the trigger receiving signal outputted from the trigger signal receiver 73 or after passing a predetermined term from receiving the trigger receiving signal.

In addition, in the above position detecting system, the wave transmitter 1 is mounted on the migration object 4 and the wave receiver 3 is installed on a settlement face such as the ceiling 200. It, however, is possible to provide the wave transmitter 1 on a settlement face and the wave receiver 3 is mounted on the migration object 4.

This application is based on Japanese patent applications 2004-219330, 2004-219331, 2005-5639, 2005-5640 and 2005-86787 filed in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

The invention claimed is:

1. An acoustic wave sensor, comprising:
    a wave transmitter configured to transmit an acoustic wave and a driving circuit configured to drive the wave transmitter;
    wave receivers configured to one of directly receive the acoustic wave transmitted from the wave transmitter and receive the acoustic wave transmitted from the wave transmitter and reflected by an object, and convert the received acoustic wave to wave receiving signals of electric signals;
    a memory configured to store the wave receiving signals of each of the wave receivers; and
    a processor configured to calculate a distance to the object and an orientation where the object is located using data of the wave receiving signals stored in the memory, wherein
    a first plurality of the wave receivers are arranged at a predetermined pitch in a first direction and a second plurality of the wave receivers are arranged at the predetermined pitch in a second direction perpendicular to the first direction and on a same plane of a single circuit board for measuring the distance to the object and the orientation where the object is located,
    different delay times are set for outputs of the wave receivers corresponding to the orientation where the object is located for distinguishing the wave receiving signals caused by the acoustic waves reflected by the object, and the processor includes:
    a delay configured to delay the wave receiving signals of the wave receivers stored in the memory with a delay time which corresponds to an arrangement pattern, grouping the delayed wave receiving signals, and outputting the grouped delayed wave receiving signals;
    an adder configured to add the group of the delayed wave receiving signals, and
    a judger configured to compare a peak value of an added output waveform with a predetermined threshold value and judging that a received orientation corresponding to the combination of the delay times is the orientation where the object is located when the peak value larger than the predetermined threshold value is received.

2. The acoustic wave sensor in accordance with claim 1, wherein
    the wave transmitter comprises an acoustic wave generator having a heating conductor of a thin film, the acoustic wave generator being configured to generate the acoustic wave by applying a thermal impact to air due to a temperature change of the heating conductor corresponding to energization to the heating conductor.

3. The acoustic wave sensor in accordance with claim 2, wherein
the acoustic wave generator comprises a base substrate, a heating conductor layer being the heating conductor and formed on at least a surface of the base substrate, and a thermal insulation layer between the base substrate and the heating conductor layer.

4. The acoustic wave sensor in accordance with claim 1, wherein
an acoustic wave generator has a pair of electrodes facing each other in air, and generates the acoustic wave by applying thermal impact to the air due to generation of a spark discharge between the pair of electrodes by applying a predetermined voltage between the pair of electrodes.

5. The acoustic wave sensor in accordance with claim 1, wherein
the wave receivers are configured to detect a second orientation from which acoustic waves arrive at the wave receivers based on a phase difference of the wave receiving signals output from the wave receivers and an arrangement of the wave receivers.

6. The acoustic wave sensor in accordance with claim 1, wherein
each of the wave receivers comprises an electrical capacitance microphone configured to convert variation of pressure due to acoustic pressure of the acoustic wave to variation of electric signal.

* * * * *